(12) United States Patent
Stergiopoulos et al.

(10) Patent No.: US 6,719,696 B2
(45) Date of Patent: *Apr. 13, 2004

(54) HIGH RESOLUTION 3D ULTRASOUND IMAGING SYSTEM DEPLOYING A MULTI-DIMENSIONAL ARRAY OF SENSORS AND METHOD FOR MULTI-DIMENSIONAL BEAMFORMING SENSOR SIGNALS

(75) Inventors: Stergios Stergiopoulos, Toronto (CA); Amar C. Dhanantwari, North York (CA)

(73) Assignee: Her Majesty the Queen in right of Canada as represented by the Minister of National Defence, Ottawa (CA)

( * ) Notice: Subject to any disclaimer, the term of this patent is extended or adjusted under 35 U.S.C. 154(b) by 0 days.

This patent is subject to a terminal disclaimer.

(21) Appl. No.: 10/273,951

(22) Filed: Oct. 21, 2002

(65) Prior Publication Data

US 2003/0065262 A1 Apr. 3, 2003

Related U.S. Application Data

(63) Continuation of application No. 09/718,516, filed on Nov. 24, 2000, now Pat. No. 6,482,160.

(30) Foreign Application Priority Data

Nov. 24, 1999 (CA) .............................................. 2290240

(51) Int. Cl.[7] .................................................. A61B 8/00
(52) U.S. Cl. .................... 600/443; 600/447; 128/916
(58) Field of Search ............................... 600/437, 438, 600/440, 441, 442, 443, 444, 447, 449, 453–471; 367/7, 11, 130, 138, 121; 73/620–633, 599; 128/916; 342/81, 368, 378

(56) References Cited

U.S. PATENT DOCUMENTS

| | | | |
|---|---|---|---|
| 5,570,691 A | * | 11/1996 | Wright et al. ................ 600/447 |
| 5,623,928 A | * | 4/1997 | Wright et al. ................ 600/447 |
| 5,856,955 A | * | 1/1999 | Cole et al. .................. 369/77.2 |
| 5,891,038 A | * | 4/1999 | Seyed-Bolorforosh et al. ............................ 600/447 |
| 5,984,869 A | * | 11/1999 | Chiao et al. ................. 600/437 |
| 6,111,816 A | * | 8/2000 | Chiang et al. .................. 367/7 |
| 6,292,433 B1 | * | 9/2001 | Gilbert et al. ............... 367/138 |
| 6,482,160 B1 | * | 11/2002 | Stergiopoulos et al. ....... 600/43 |

* cited by examiner

*Primary Examiner*—Ali M. Imam
(74) *Attorney, Agent, or Firm*—Freedman & Associates

(57) ABSTRACT

An adaptive multidimensional beamformer having near-instantaneous convergence for ultrasound imaging systems deploying multidimensional sensor arrays is disclosed. In a first step, the multidimensional beamformer is decomposed into sub-apertures. Each sub-aperture is then again decomposed into two coherent subsets of circular and/or line array beamformers in different coordinate directions of the multidimensional array. Implementation of the multidimensional beamformer according to the present invention provides the basis for a 3D ultrasound imaging system according to the present invention comprising a compact multidimensional sensor array and a compact processing unit that is field deployable and generates high resolution three-dimensional images in real time. It is also possible to capture four-dimensional images, the fourth dimension being time and the resulting images forming a video image of a volume of a moving organ.

22 Claims, 19 Drawing Sheets

Simulated matched filter results for ultrasound applications of conventional adaptive & synthetic eperture beamformers and for fm type of pulses. Results provide a quantitative assessment of image resolution for the proposed adaptive beamformers.

HIGH RESOLUTION 3D ULTRASOUND IMAGING SYSTEM DEPLOYING A MULTI-DIMENSIONAL ARRAY OF SENSORS AND METHOD FOR MULTI-DIMENSIONAL BEAMFORMING SENSOR SIGNALS

This application is a continuation of Ser. No. 09/718,516 filed on Nov. 24, 2000, now U.S. Pat. No. 6,482,160.

FIELD OF THE INVENTION

This invention relates to the field of ultrasound imaging systems. In particular, the present invention relates to field deployable 3D ultrasound imaging systems providing high resolution images in real time.

BACKGROUND OF THE INVENTION

Ultrasound sensing and imaging technology provides a powerful tool for non-invasive imaging for treatment assessment and for minimally invasive surgery. Unlike CT scanners and MRI ultrasound imaging systems are compact and much cheaper to manufacture. These advantages allow use of ultrasound imaging systems in mobile units such as an ambulance or a helicopter. In general, victims of accidents, disasters or wars need immediate assessment and treatment in order to save their lives. For example, deployment of compact ultrasound imaging systems in mobile units allows on site imaging for treatment assessment during transportation providing live saving information for later surgery in a hospital or even providing information for minimally invasive surgery within the mobile unit. Therefore, it would be highly advantageous to provide a compact field-deployable 3D ultrasound imaging system for mobile units and field hospitals for immediate imaging of victims on accident sites, in disaster areas or in war zones.

However, state of the art ultrasound imaging systems suffer from very poor image resolution due to the very small size of sensor arrays of compact systems. Therefore, such systems do not provide images having a satisfying resolution for treatment assessment or surgery. In order to improve image quality it is necessary to deploy a large number of sensors in a compact multidimensional array to provide significant improvements in array gain for signals embedded in partially correlated noise fields. Partially correlated noise fields are caused, for example, by non-linear propagation characteristics of the human body and result in aberration effects and fuzziness in reconstructed images. The improvements in array gain result in image resolution improvements and minimization of the aberration effects.

An overview of the state of the art in adaptive and synthetic aperture beamformers is given in "Implementation of Adaptive and Synthetic Aperture Processing Schemes in Integrated Active-Passive Sonar Systems", Proceedings of the IEEE, 86(2), pp. 358–397, February, 1998 by S. Stergiopoulos. These algorithms have been designed to increase the signal-to-noise ratio for improved target detection and to provide simultaneously parameter estimates such as frequency, time delay, Doppler shift and bearing for incorporation into algorithms localising, classifying and tracking acoustic signals.

To optimize the beam forming process, beamforming filter coefficients have to be chosen based on data received from a sensor array of the sonar system. In particular, the coefficients have to be chosen based on the statistical properties of the received data. Algorithms using characteristics of noise received from the sensor array for optimizing the beamforming process are called adaptive beamformers. The adaptive beamformers require knowledge of a correlated noise's covariance matrix. However, if the knowledge of the noise's characteristic is inaccurate, performance of the adaptive beamformer will degrade significantly and may even result in cancellation of a desired signal. Therefore, it is very difficult to implement useful adaptive beamformers in real time operational systems. Numerous articles on adaptive beamformers and the difficulties concerning their implementation have been published. Various adaptive beamformers such as the Generalized Sidelobe Cancellers (GSC), the Linearly Constrained Minimum Variance Beamformers (LCMV) and the Minimum Variance Distortionless Response (MVDR) are discussed in the following references, which are hereby incorporated by reference:

B. Windrow et al.: "Adaptive Antenna Systems", Proceedings IEEE, 55(12), pp. 2143–2159, 1967;

N. L. Owsley: "Sonar Array Processing", S. Haykin, Editor, Prentice-Hall Signal Processing Series, A. V. Oppenheim Series Editor, pp. 123, 1985;

B. Van Veen and K. Buckley: "Beamforming: a Versatile Approach to Spatial Filtering", IEEE ASSP Mag., pp. 4–24, 1988;

J. Capon: "High Resolution Frequency Wavenumber Spectral Analysis", Proc. IEEE, 57, pp. 1408–1418, 1969;

S. Haykin: "Adaptive Filter Theory", Prentice-Hall, Englewood Cliffs, N.J., 1986;

T. L. Marzetta: "A New Interpretation for Capon's Maximum Likelihood Method of Frequency-Wavenumber Spectra Estimation", IEEE-Trans. Acoustic Speech Signal Proc., ASSP-31(2), pp. 445–449, 1983;

A. H. Sayed and T. Kailath: "A State-Space Approach to Adaptive RLS Filtering", IEEE SP Mag., pp. 18–60, July, 1994;

A. B. Baggeroer, W. A. Kuperman and P. N. Mikhalevsky: "An Overview of Matched Field Methods in Ocean Acoustics", IEEE J. Oceanic Eng., 18(4), pp. 401–424, 1993;

H. Wang and M. Kaveh: "Coherent Signal-Subspace Processing for the Detection and Estimation of angles of Arrival of Multiple Wideband Sources", IEEE Trans. Acoust. Speech, Signal Proc., ASSP-33, pp. 823–831, 1985;

J. Krolik and D. N. Swingler: "Bearing Estimation of Multiple Brodband Sources using Steered Covariance Matrices", IEEE Trans. Acoust. Speech, Signal Proc., ASSP-37, pp. 1481–1494, 1989;

S. D. Peters: "Near-Instantaneous Convergence for Memoryless Narrowband GSC/NLMS Adaptive Beamformers", submitted to IEEE Trans. Acoust. Speech, Signal Proc., January 1995;

L. J. Griffiths and C. W. Jim: "An Alternative Approach to Linearly Constrained Adaptive Beamforming", IEEE Trans. on Antennas and Propagation, AP-30, pp. 27–34, 1982; and, D. T. M. Slock: "On the Convergence Behavior of the LMS and the Normalized LMS Algorithms", IEEE Trans. Acoust. Speech, Signal Proc., ASSP-31, pp. 2811–2825, 1993.

Unfortunately, implementation of adaptive beamformers in modern ultrasound systems comprising multi-dimensional arrays with hundreds of sensors requires very large amounts of memory and very large processing capabilities for real time data processing making their application for field-deployable systems impossible. To implement adaptive beamformers using current computer technology, the concept of partially adaptive beamformer design has been developed. The partially adaptive beamformer reduces the number of degrees of freedom, associated with the beamforming process, lowering the computational requirements and improving response time. Unfortunately, due to the reduction of the number of degrees of freedom the partially adaptive beamformers cannot converge to an optimum solution as fully adaptive beamformers. Therefore, the partially adaptive beamformers cannot make substantial use of multidimensional arrays deployed in ultrasound systems in order to improve array gain and to provide images with high resolution.

It is, therefore, an object of the invention to overcome the problems associated with the implementation of adaptive beamformers in modem ultrasound imaging systems comprising multidimensional sensor arrays.

It is further an object of the invention to provide adaptive beamformers with near-instantaneous convergence for ultrasound imaging systems deploying line arrays, circular arrays, spherical arrays of sensors or any superposition of these types of arrays.

It is yet another object of the invention to provide a 3D ultrasound imaging system comprising a multidimensional sensor array for generating high resolution images in real time using an adaptive beamforming process that is field-deployable.

SUMMARY OF THE INVENTION

In accordance with the present invention there is provided, an adaptive multidimensional beamformer having near-instantaneous convergence for ultrasound imaging systems. Implementation of the multidimensional beamformer according to the present invention provides the basis for a 3D ultrasound imaging system according to the present invention comprising a compact multidimensional sensor array and a compact processing unit that is field deployable and generates high resolution images in real time or near real time.

In accordance with the present invention there is provided, a method for multidimensional beamforming sensor time series provided by sensors deployed in a multidimensional array of an ultrasound imaging system comprising the steps of:

decomposing the multidimensional beamformer into two coherent subsets of circular array beamformers and/or line array beamformers, a first subset comprising subsequent beamformers in a first coordinate direction of the multidimensional array and a second subset comprising subsequent beamformers in a second other coordinate direction of the multidimensional array;
beamforming for a predetermined beam steering direction of data relating to the sensor time series by applying the subsequent beamformers of the first subset, each beamformer producing a beam time series; and,
beamforming for the predetermined beam steering direction each beam time series of the first subset of beamformers applying the subsequent beamformers of the second subset for the steered direction producing one beam time series for the beam steering direction.

In accordance with aspect of the present invention there is provided, a method for multidimensional beamforming sensor time series provided by sensors deployed in a multidimensional array of an ultrasound imaging system using a sub-aperture configuration, the method comprising the steps of:

a) dividing the multidimensional beamformer into a plurality of subsequent sub-apertures;
b) decomposing each sub-aperture into two coherent subsets of circular array beamformers and/or line array beamformers, a first subset comprising subsequent beamformers in a first coordinate direction of the multidimensional array and a second subset comprising subsequent beamformers in a second other coordinate direction of the sub-aperture;
c) conventional beamforming each sub-aperture for a predetermined beam steering direction a Fourier transform of the sensor time series by applying the subsequent beamformers of the first subset each beamformer producing a beam time series;
d) conventional beamforming each sub-aperture for the predetermined beam steering direction the beam time series produced by the beamformers of step c) by applying the subsequent beamformers of the second subset for the steered direction producing one beam time series for the beam steering direction for each sub-aperture; and,
e) adaptive beamforming on line arrays, each line array comprising beam time series of different subsequent sub-apertures in one coordinate direction, providing one or more beam time series for the beam steering direction.

In accordance with another aspect of the present invention there is provided, a method for beamforming sensor time series provided by sensors of an ultrasound imaging system using a coherent broad band adaptive beamformer, the method comprising the steps of:

segmenting the continuous sensor time series into a set of overlapped data sets;
calculating a FFT of each overlapped data set producing a set of Fourier transforms of the overlapped data sets for different frequency bins;
forming a cross spectral density matrix from the Fourier transforms of the overlapped data sets for each frequency bin and each predetermined steering direction;
forming a steering covariance matrix using the cross spectral density matrix and a diagonal matrix of conventional steering vectors, one steering covariance matrix for each steering direction and a frequency band of interest;
inverting the steering covariance matrices;
estimating adaptive steering vectors by assuming stationarity across frequency bins of a frequency band of interest and considering an estimate of the steering covariance matrix being the same as a narrow band estimate for a center frequency of the frequency band of interest;
determining narrow band adaptive steering weights using the estimate of the adaptive steering vectors;
forming adaptive beams in frequency domain from the Fourier transform of the overlapped data sets and the adaptive steering weights;
forming adaptive beams in time domain through IFFT; and,
determining continuous beam time series by discarding overlap and concatenation of segments.

In accordance the present invention there is further provided, a field deployable 3D ultrasound imaging system for producing high resolution 3D images of an object in real time, the ultrasound system comprising:

a source for emitting ultrasound waves;
a compact adaptive multidimensional sensor array for capturing reflections of the ultrasound waves, the ultrasound waves being reflected by different structures within the object, and for providing sensor time series indicative of the reflected ultrasound waves;

a compact processing unit for:
  receiving the sensor time series produced by the multidimensional sensor array;
  processing the sensor time series in order to produce continuous beamtime series by:
    decomposing a multidimensional beamformer into sub-apertures comprising coherent subsets of circular array beamformers and/or line array beamformers;
    conventional beamforming circular arrays;
    adaptive beamforming line arrays; and,
  reconstructing 3D images from the beam time series in real time; and,
a display for displaying the reconstructed 3D images in real time.

BRIEF DESCRIPTION OF THE DRAWINGS

Exemplary embodiments of the invention will now be described in conjunction with the following drawings, in which:

FIG. 11b is a schematic diagram of a model of the signal processing for an adaptive sub-aperture structure for multidimensional arrays according to the invention shown in FIG. 11a;

FIG. 11c is a schematic diagram of another modul of the signal processing for an adaptive sub-aperture structure for multidimensional arrays according to the invention shown in FIG. 11a;

DETAILED DESCRIPTION

Figure 1:
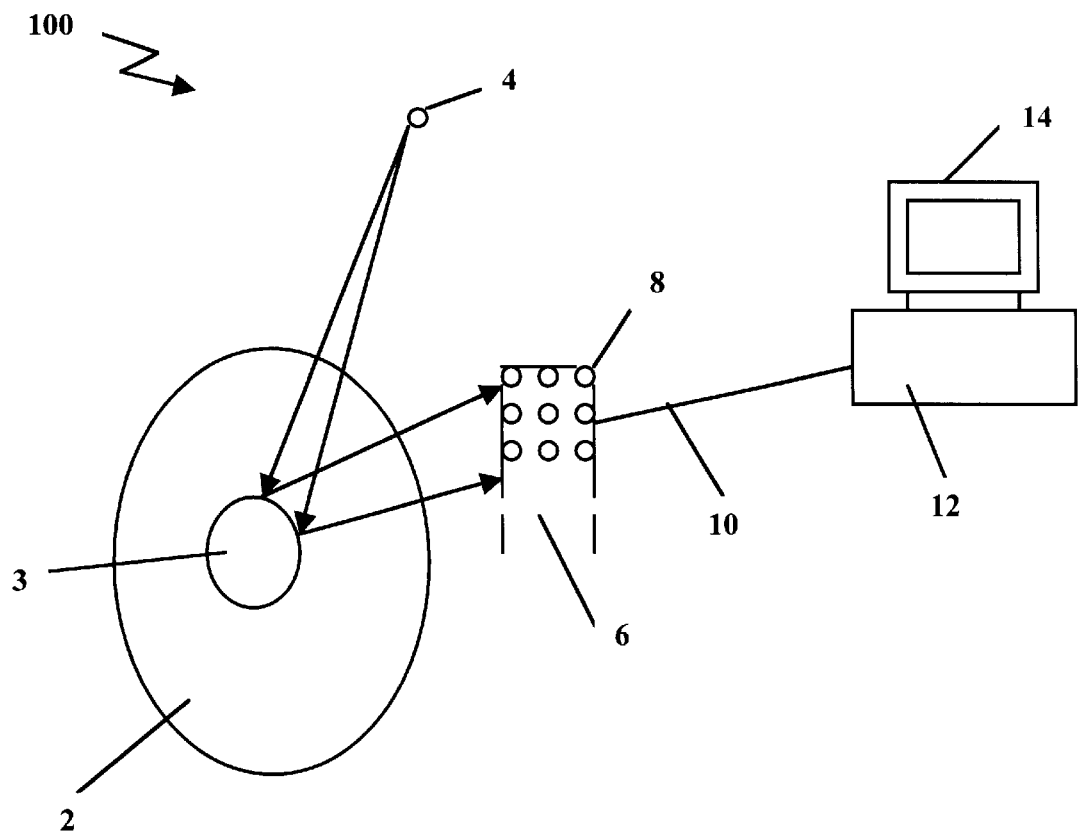
FIG. 1 is a simplified diagram of a compact field deployable ultrasound imaging system according to the invention.

FIG. 1 illustrates schematically a field deployable 3D ultrasound imaging system 100 according to the invention. An object 2 is irradiated by a source 4 emitting ultrasound waves. Different structures 3 within the object 2 reflect the ultrasound waves in different directions. The reflected ultrasound waves are then captured by a plurality of sensors 8 of a compact multidimensional—2D or 3D—sensor array 6. Output signals of the sensors 8 are transmitted via a communication link to a compact processing unit 12 such as a conventional computer workstation for processing. Reconstructed images are then displayed using display 14. Provision of high resolution images and compact design of the multidimensional sensor array 6 and the processing unit 12 for a field deployable ultrasound imaging system is made possible using an advanced beamforming process according to the present invention which will be disclosed in the following sections. The advanced beamforming process according to the present invention maximizes array gain and image resolution by effectively using all information provided by the sensor signals of the multidimensional sensor array 6. This effective use of the sensor signals allows to minimize the multidimensional sensor array 6, which is essential for the field deployable ultrasound imaging system 100. Furthermore, the advanced beamforming process according to the invention comprises a decomposition dividing a fully multidimensional beamformer into sub-sets of coherent processes which may be implemented on small size CPU's integrated within a parallel configuration of existing computing architectures. Therefore, the advanced beamforming process according to the present invention is performed using the compact processing unit 12 of the field deployable ultrasound imaging system 100. Additional, use of a sub-aperture structure of the beamforming process provides near-instantaneous convergence of adaptive beamformers allowing real time applications of the ultrasound system according to the present invention.

As a result of the decomposition according to the invention the fully multidimensional beamforming process is reduced to beamforming processes for line and circular arrays.

Figure 2:
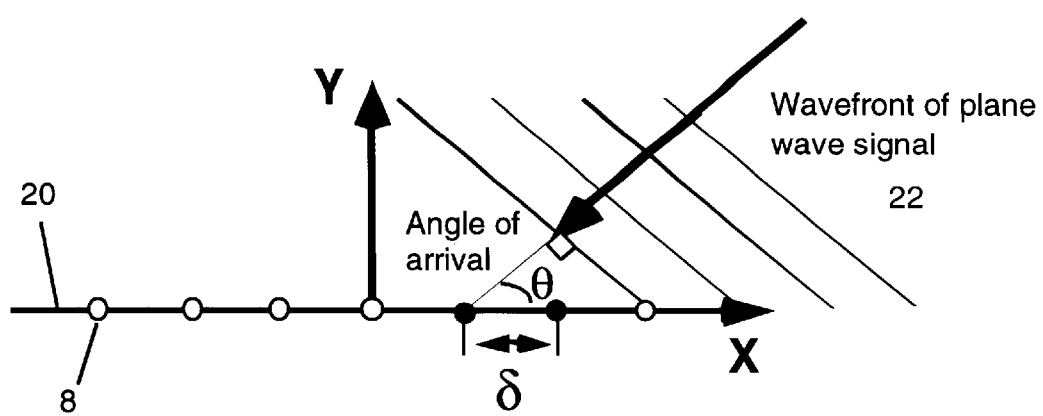
FIG. 2 is a simplified diagram of a line array of sensors for an ultrasound imaging system.

FIG. 2 illustrates a linear sensor array 20 comprising N sensors 8 with uniform sensor spacing δ receiving a plane wave signal 22 with a direction of propagation θ. $x_n(t_i)$ ($n=1, \ldots, N$; $i=1, \ldots, I$) are sensor time series produced by the N sensors 8 indicative of the received plane wave signal 22. For the plane wave signal 22 arriving at the angle $\theta$ the sensor time series are expressed by $x_n(t_i)=x_n(t_i-(n-1)\tau(\theta))$, wherein $\tau(\theta)$ is a time delay between the sensor time series of two adjacent sensors given by $\tau(\theta)=\delta \cos(\theta)/c$ with c being a propagation speed of the plane wave signal 22 in a medium of interest.

The plane wave signal response of the N—sensor line array 20 is expressed by $$B(f,\theta_s) = \overline{D}^*(f,\theta_s)\overline{X}(f), \qquad (1)$$

wherein * denotes a complex conjugate transpose. $\overline{X}(f)$ is a vector of the Fourier transform of $x_n(t_i)$ for a frequency bin f of interest. $\overline{D}^*(f,\theta_s)$ is a steering vector having, for example, its $n^{th}$ phase term for the plane wave signal 22 at an angle $\theta_s$ being expressed by $d_n(f,\theta_s)=\exp[j2\pi f(n-1)\delta \cos\theta_s/c]$, wherein $\theta_s$ is a beam steering direction angle. The beam power pattern $P(f,\theta_s)$ is then obtained by $P(f,\theta_s)=B(f,\theta_s)\times B^*(f,\theta_s)$. Side lobe structures resulting from the Fourier transformation of discontinuities in the signals, also called Gibbs effect, may be suppressed by applying different weights during the Fourier transformation—called shading—at the expense of an increased beam width. Angular response of the line array is ambiguous with respect to the angle $\theta_s$, responding equally to targets at angle $\theta_s$ and $-\theta_s$, wherein $\theta_s$ varies over the range $[0,\pi]$.

Figure 3:
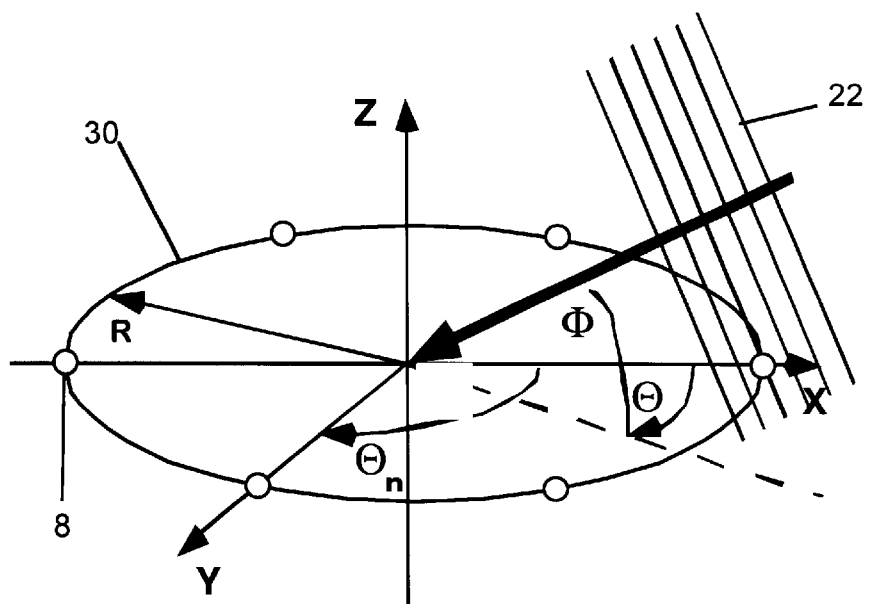
FIG. 3 is a simplified diagram of a circular array of sensors for an ultrasound imaging system.

FIG. 3 illustrates a circular sensor array 30 comprising N sensors 8 distributed uniformly on a ring with radius R. The N sensors are receiving a plane wave signal 22 arriving at an azimuth angle $\theta$ and an elevation angle $\theta$ as shown in FIG. 2. The N sensors 8 produce sensor time series $x_n(t_i)$ ($n=1, \ldots, N$; $i=1, \ldots, I$) indicative of the received plane wave signal 22.

The plane wave signal response of the circular sensor array 30 is then expressed by:

$$B(f,\theta_s,\phi_s) = \overline{D}(f,\theta_s,\phi_s)W(\theta_s)\overline{X}(f). \qquad (2)$$

$\overline{X}(f)$ is a vector of the Fourier transform of the sensor time series $x_n(t_i)$ for a frequency bin f of interest. $\overline{D}^*(f,\theta_s,\phi_s)$ is a steering vector having its $n^{th}$ phase term for the plane wave signal 22 expressed by $d_n(f,\theta_s,\phi_s)=\exp[j2\pi R \sin\phi_s \cos(\theta_s-\theta_n)/c]$ with $\theta_n=2\pi n/N$, $n=0, 1, \ldots, N-1$. The angles $\theta_s$ and $\theta_n$ are indicating beam steering direction and sensor location, respectively. $W(\theta_s)$ is a diagonal matrix with off diagonal elements being zero and diagonal terms being weights of a spatial window to reduce side lobe structure. The spatial window is, in general, not uniform and depends on the sensor location and the beam steering direction. The beam power pattern $P(f,\theta_s,\phi_s)$ is then obtained by $P(f,\theta_s,\phi_s)=B(f,\theta_s,\phi_s)\times B^*(f,\theta_s,\phi_s)$. An angular response of the circular sensor array 30 covers the range $[0,2\pi]$ and, therefore, has no ambiguity with respect to the azimuth angle $\theta$.

Figure 4:
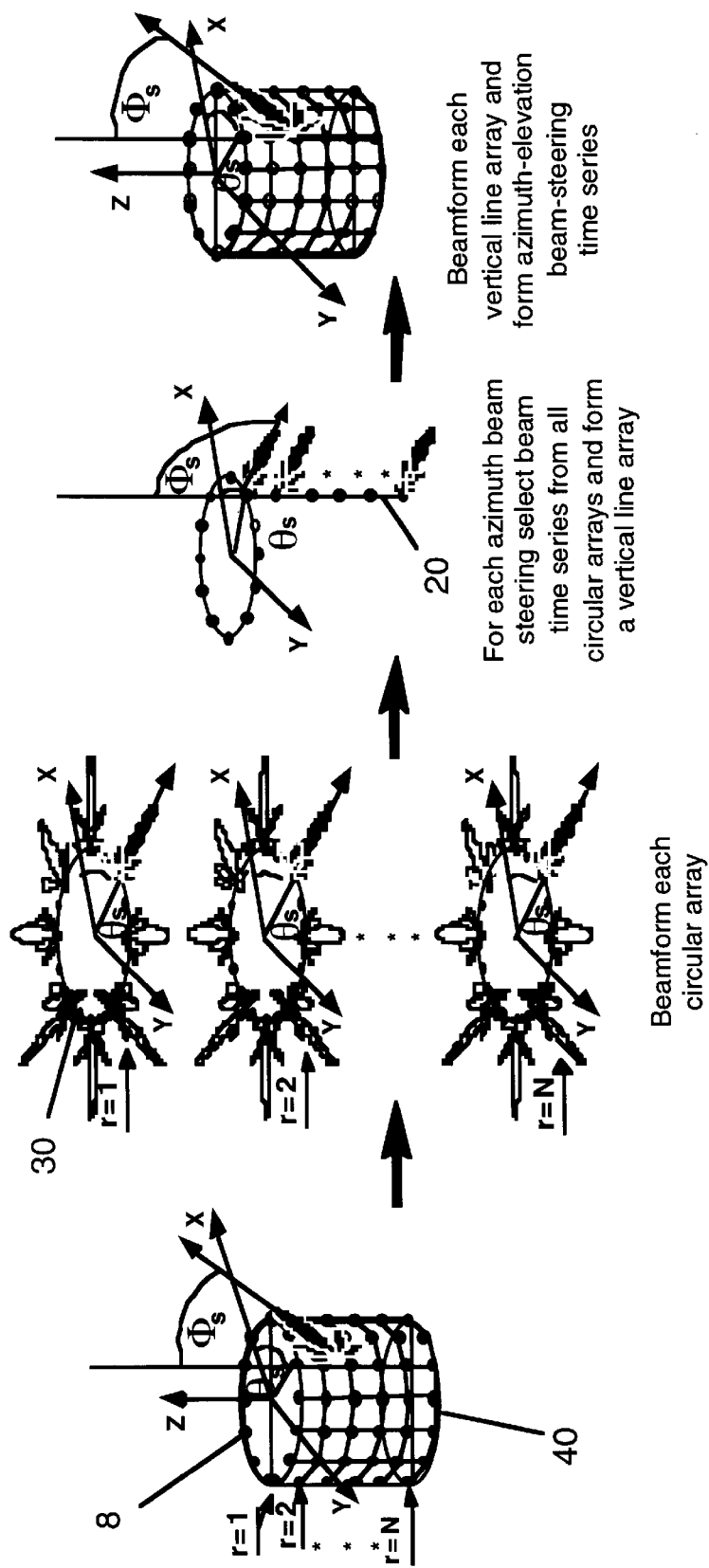
FIG. 4 is a simplified diagram of a cylindrical array of sensors for an ultrasound imaging system illustrating a decomposition concept according to the invention.

Referring to FIG. 4 a decomposition process of a cylindrical array beamformer into coherent sub-sets of linear and circular array beamformers according to the invention is shown. A cylindrical sensor array 40 as shown in FIG. 4 comprises sensors 8, wherein $=NM$ with N being the number of circular sensor arrays 30 and M being the number of sensors 8 on each circular sensor array 30, that is the number of line sensor arrays 20. Angular response of the cylindrical sensor array 40 to a steered direction at $(\theta_s,\phi_s)$ as indicated in FIG. 4 is expressed as follows:

$$B(f,\theta_s,\phi_s) = \sum_{r=0}^{N-1}\sum_{m=0}^{M-1} w_{r,m} X_{r,m}(f) d_{r,m}^*(f,\theta_s,\phi_s). \qquad (3)$$

$w_{r,m}$ is the $(r,m)^{th}$ term of matrix $W(\theta,\phi)$ comprising weights of a three dimensional spatial window to suppress sidelobe structures. $X_{r,m}(f)$ is the $(r,m)^{th}$ term of matrix $\underline{X}(f)$ expressing the Fourier Transform of a sensor time series of the $m^{th}$ sensor on the $r^{th}$ circular array. $\underline{D}(f,\theta_s,\phi_s)$ is a steering matrix having its $(r,m)^{th}$ phase term for a plane wave signal expressed by $d_{r,m}(f,\theta_s,\phi_s)=\exp(j2\pi f(r\delta_z \cos\phi_s + R\sin\phi_s \cos(\theta_s-\theta_m))/c)$, with R being a radius of the circular sensor array 30, $\delta_z$ being a distance between subsequent circular arrays in z-direction and $\theta_m=2\pi m/M$, $m=0, 1, \ldots, M-1$ indicating a position of a sensor 8 on the circular array 30. Inventor found a re-arranged form of equation (3), which is expressed as follows:

$$B(f,\theta_s,\phi_s) = \sum_{r=0}^{N-1} w_{1,r} d_r^*(f,\theta_s,\phi_s)\left[\sum_{m=0}^{M-1} X_{r,m}(f) w_{2,m} d_m^*(f,\theta_s,\phi_s)\right]. \qquad (4)$$

$d_r(f,\theta_s,\phi_s)=\exp(j2\pi fr\delta_z \cos\phi_s/c)$ is the $r^{th}$ term of steering vector $\overline{D}_z(f,\theta_s,\phi_s)$, which is the kernel of a line array beamformer as discussed above and $w_{1,r}$ is the term of a spatial window for line array spatial shading. $d_m(f,\theta_s,\phi_s)=\exp(j2\pi fR\sin\phi_s \cos(\theta_s-\theta_m)/c)$ is the $m^{th}$ term of steering vector $\overline{D}_y(f,\theta_s,\phi_s)$, which is the kernel of a circular array beamformer as discussed above and $w_{2,m}$ is the term of a spatial window for circular array spatial shading. Equation (4) expresses a cylindrical array beamformer comprising a product of two summations, the first being a linear array beamformer and the second being a circular array beamformer. According to the invention a beamforming process for a cylindrical array as expressed by equation (4) is decomposed into two steps as shown in FIG. 4. In a first step circular array beamforming is performed for each of the N circular sensor arrays 30, each array comprising M sensors 8, to produce N beam time series outputs. In a second step line array beamforming is performed on the N beam time series outputs of the first step producing one beam time series for the steered direction. The same process is then repeated for other beam steering directions of interest. Alternatively, the process is reversed performing line array beamforming first.

The decomposition process according to the invention based on equation (5) substantially facilitates cylindrical array beamforming. The number of mathematical operations and the amount of memory required to perform these operations are substantially reduced by expressing the cylindrical beamformer as a product of two sums, instead of a double summation as expressed by equation (3). It, therefore, eliminates the need for very large memory and very fast CPU's for real time system applications. This allows application of advanced beamforming algorithms for multidimensional arrays using currently available computer technology such as a conventional computer workstation in the compact processing unit 12.

As is evident, the circular and line array beamformers resulting from the decomposition process according to the invention may be executed in parallel allowing optimal execution of the beamforming operations using computer with parallel processors substantially enhancing performance of the beamforming process. This allows real time applications of the ultrasound imaging system 100 using current available computer technology within the compact processing unit 12.

Furthermore, because equation (4) is directly derived from equation (3) without further assumptions, the decomposed cylindrical array beamforming process according to the invention does not include a loss in the number of degrees of freedom. Therefore, the decomposed cylindrical array beamforming process according to the invention converges to an optimum solution as expressed by equation (3).

Another advantage of the decomposition process according to the invention is a much simpler design and incorporation of three-dimensional spatial windows. A non-uniform shading window may be applied for each circular array beamformer to improve angular response with respect to azimuth angle θ. A uniform shading window may then be applied to the line array beamformer to improve angular response with respect to elevation angle φ. Of course, other types of shading windows or combinations may be applied.

Decomposition processes for planar and spherical arrays are very similar to the decomposition process for the cylindrical array described above. Detailed descriptions of these processes are published the inventor in A. Tawfik and S. Stergiopoulos: "A Generic Processing Structure Decomposing the Beamforming Process of 2-D & 3-D Arrays of Sensors into Sub-Sets of Coherent Processes", submitted to IEEE, J. Oceanic Eng., July, 1997. Of course, the decomposition according to the invention may also be applied to sensor arrays other than cylindrical, planar and spherical arrays.

The beamforming process expressed by equations (1) and (2) for line sensor arrays 20 and circular sensor arrays 30, respectively, is a time delay beamforming estimator being basically a spatial filter. However, optimum beamforming requires beamforming filter coefficients to be chosen based on characteristics of noise received by the sensor array in order to optimize sensor array response. Algorithms for optimum beamforming using characteristics of noise received by the sensor array are called adaptive beamformers. Beamforming filter coefficients of these algorithms are chosen based on a covariance matrix of correlated noise received by the sensor array. However, if the knowledge of the noise's characteristic is inaccurate, performance of the adaptive beamformer will degrade significantly and may even result in cancellation of a desired signal. Therefore, it is very difficult to implement useful adaptive beamformers in real time operational systems. Furthermore, for post processing such as matched filter processing the adaptive beamformer has to provide coherent beam time series. In particular, the matched filter processing requires near-instantaneous convergence of the beamformer producing a continuous beam time series correlating with a reference signal.

In adaptive beamforming, beamformer response is optimized to contain minimum contributions due to noise and signals arriving from directions other than a direction of a desired signal. For the optimization, it is desired to find a linear filter vector $\bar{Z}(f_i,\theta)$ which is a solution to a constraint minimization problem that allows signals from a desired direction to pass with a specified gain. The minimization problem is expressed as follows:

$$\text{Minimize } \delta_{MV}{}^2 = \bar{Z}^*(f_i,\theta)R(f_i)\bar{Z}(f_i,\theta) \text{ subject to } \bar{Z}^*(f_i,\theta)\bar{D}(f_i,\theta)=1. \quad (5)$$

$\bar{D}(f_i,\theta)$ is the conventional steering vector based on equation (1). $R(f_i)$ is a spatial correlation matrix of received sensor time series with elements $R_{nm}(f_i,\delta_{nm})=E\{X_n(f)X_m(f)\}$, wherein $E\{\ldots\}$ denotes an expectation operator and $\delta_{nm}$ is sensor spacing between $n^{th}$ and $m^{th}$ sensor. The solution of the minimization problem is expressed by $$\bar{Z}(f_i,\theta) = \frac{R^{-1}(f_i)\bar{D}(f_i,\theta)}{\bar{D}^*(f_i,\theta)R^{-1}(f_i)\bar{D}(f_i,\theta)}. \quad (6)$$

Equation (6) provides adaptive steering vectors for beamforming signals received by a N—sensor array. In frequency domain an adaptive beam at a steering angle $\theta_s$ is then defined by $$B(f_i,\theta_s)=\bar{Z}^*(f_i,\theta_s)\bar{X}(f_i), \quad (7)$$

corresponding to conventional beams expressed by equation (1).

In "Bearing Estimation of Multiple Broadband Sources using Steered Covariance Matrices", IEEE Trans. Acoust. Speech, Signal Proc., ASSP-37, pp. 1481–1494, 1989, J. Krolik and D. N. Swingler have shown that convergence time for a broadband source location is reduced by using a space-time statistic called steered covariance matrix (STCM). This method achieves significantly shorter convergence times than adaptive algorithms based on a narrowband cross spectral density matrix (CSDM) as taught by B. Van Veen and K. Buckley in: "Beamforming: a Versatile Approachto Spatial Filtering", IEEE ASSP Mag., pp. 4–24, 1988, without sacrificing spatial resolution. The number of statistical degrees of freedom available to estimate the STCM is approximately the product of time and bandwidth T×BW compared to an observation time (T=M/$F_s$, $F_s$ being a sampling frequency) in CSDM methods. This provides an improvement of approximately BW, being the size of a broadband source bandwidth, in convergence time.

Output of a conventional beamformer in frequency domain is expressed by equation (1). A corresponding output $\xi(t_i,\theta_s)$ in time domain is then expressed as the weighted sum of steered sensor outputs $$\xi(t_i,\theta_s) = \sum_{n=1}^{N} x_n(t_i - \tau_s). \quad (8)$$

Since $\xi(t_i,\theta_s)$ is an inverse fast Fourier transformation (IFFT) of $B(f,\theta_s)$ continuous beam time sequences are obtained from the output of a frequency domain beamformer using fast Fourier transformation (FFT) and fast convolution procedures.

Using the beamformer output an expected broadband beam power $B(\theta)$ is given by:

$$B(\theta_s) = E\{|\xi(t_i,\theta_s)|\} = \bar{h}^* E\{\bar{x}^*(t_i,\tau_n(\theta))\bar{x}(t_i,\tau_m(\theta))\}\bar{h}, \quad (9)$$

wherein the vector $\bar{h}$ includes weights for spatial shading. The term $$\Phi(t_i,\theta_s) = E\{\bar{x}(t_i,\tau_n(\theta_s))\bar{x}^*(t_i,\tau_m(\theta_s))\} \quad (10)$$

is defined as the STCM in time domain and is assumed to be independent of $t_i$ in stationary conditions. Supposing that $X_n(f_i)$ is the Fourier transform of the sensor time series and assuming that the sensor time series are approximately band limited a vector of steered sensor outputs $x_n(t_i,\tau_n(\theta_s))$ is expressed by $$\overline{x}(t_i, \tau_n(\theta_s)) = \sum_{k=l}^{l+H} T_k(f_k, \theta_s)\overline{X}(f_k)\exp(j2\pi f_k t_i). \quad (11)$$

$T(f_k,\theta)$ is a diagonal steering matrix with elements identical to the elements of the conventional steering vector $\overline{D}(f_i,\theta)$ and is expressed as follows:

$$T(f_k, \theta) = \begin{bmatrix} 1 & 0 & \cdots & 0 \\ 0 & d_1(f_k, 0) & & \\ \vdots & & \ddots & \vdots \\ 0 & & \cdots & d_N(f_k, \theta) \end{bmatrix}. \quad (12)$$

The STCM follows then directly from the above equations as $$\Phi(\Delta f, \theta_s) = \sum_{k=l}^{l+H} T(f_k, \theta_s)R(f_k)T^*(f_k, \theta_s), \quad (13)$$

wherein the index k=l,l+1, ..., l+H refers to frequency bins in a band of interest $\Delta f$ and $R(f_k)$ is the CDSM for the frequency bin $f_k$.

In steered minimum variance algorithms (STMV) a spectral estimate of broadband spatial power is given by:

$$B(\theta_s) = [\overline{I}^*\Phi(\Delta f, \theta_s)^{-1}\overline{I}]^{-1}. \quad (14)$$

However, estimates of $B(\theta)$ according to equation (14) do not provide coherent beam time series because they represent the broadband beam power output of an adaptive process. Therefore, according to the invention the estimation process of the STMV has been modified to determine complex coefficients of $\Phi(\Delta f,\theta_s)$ for all frequency bins in a frequency band of interest.

The STMV algorithm is used in its original form to generate an estimate of $\Phi(\Delta f,\theta)$ for all frequency bands $\Delta f$ of a received signal. Assuming stationarity across the frequency bins of a band $\Delta f$ the estimate of the STMV is considered to be approximately the same as a narrowband estimate $\Phi(f_0,\theta)$ for a center frequency $f_0$ of the band $\Delta f$. Narrowband adaptive coefficients are then derived from $$\overline{w}(f_0, \theta) = \frac{\Phi(f_0, \Delta f, \theta)^{-1}\overline{D}(f_0, \theta)}{\overline{D}^*(f_0, \theta)\Phi(f_0, \Delta f, \theta)^{-1}\overline{D}(f_0, \theta)}. \quad (15)$$

Phase variations of $\overline{w}(f_0,\theta)$ across the frequency bins i=l,l+1, ..., l+H are modeled by $$w_n(f_i,\theta)=\exp[2\pi f_i \psi(\Delta f,\theta)], \; i=l,l+1, \ldots, l+H, \quad (16)$$

wherein $\psi_n(\Delta f,\theta)$ is a time delay term derived from $$\psi_n(\Delta f,\theta)=F[w_n(\Delta f,\theta),2\pi f_0]. \quad (17)$$

Using the adaptive steering weights $w_n(\Delta f,\theta)$, provided by equation (16), adaptive beams are formed by $$B(f_i,\theta_s)=\overline{w}^*(f_i,\theta_s)\overline{X}(f_i). \quad (18)$$

Figure 5A:
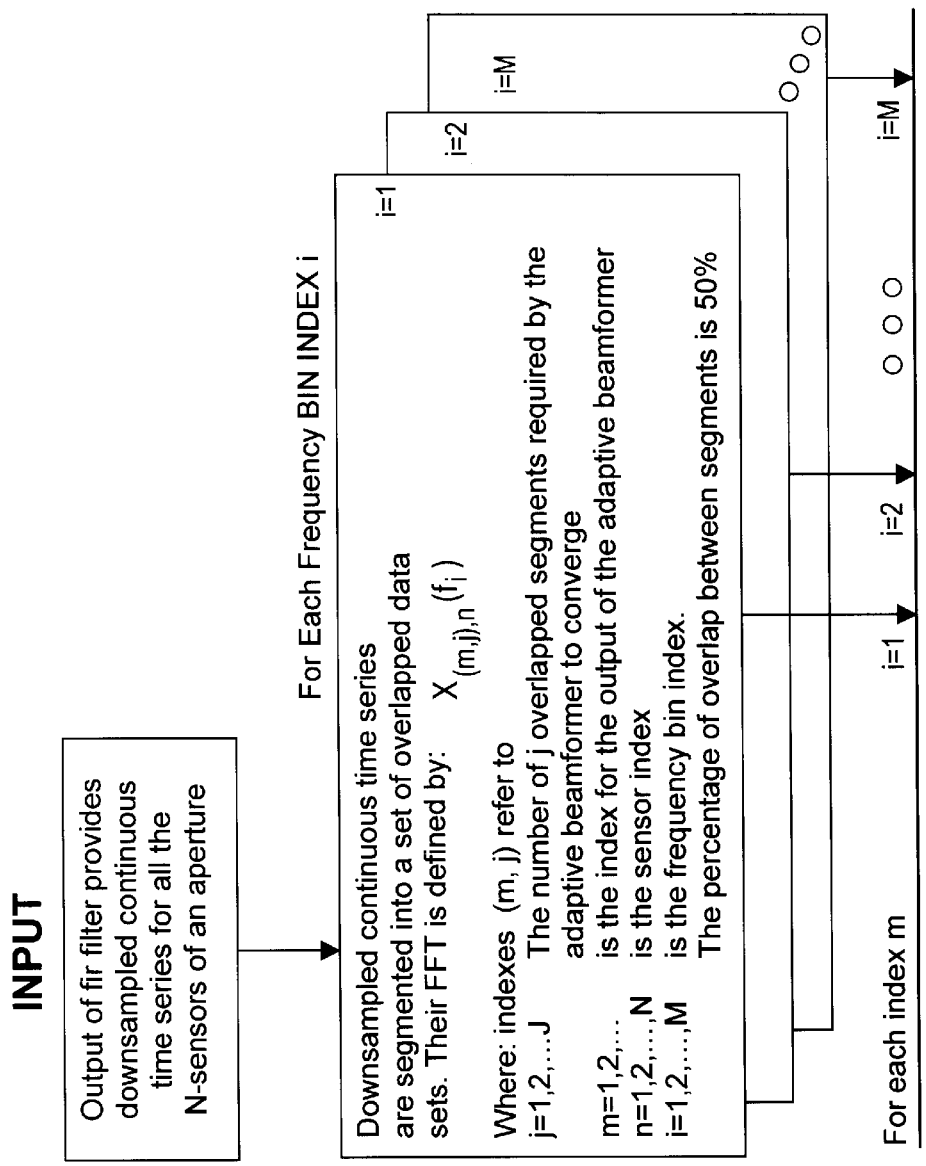
FIG. 5a is a simplified flow diagram of an adaptive beamformer according to the invention for an ultrasound imaging system comprising the steps of segmenting the sensor time series and transforming same into frequency domain.
Figure 5B:
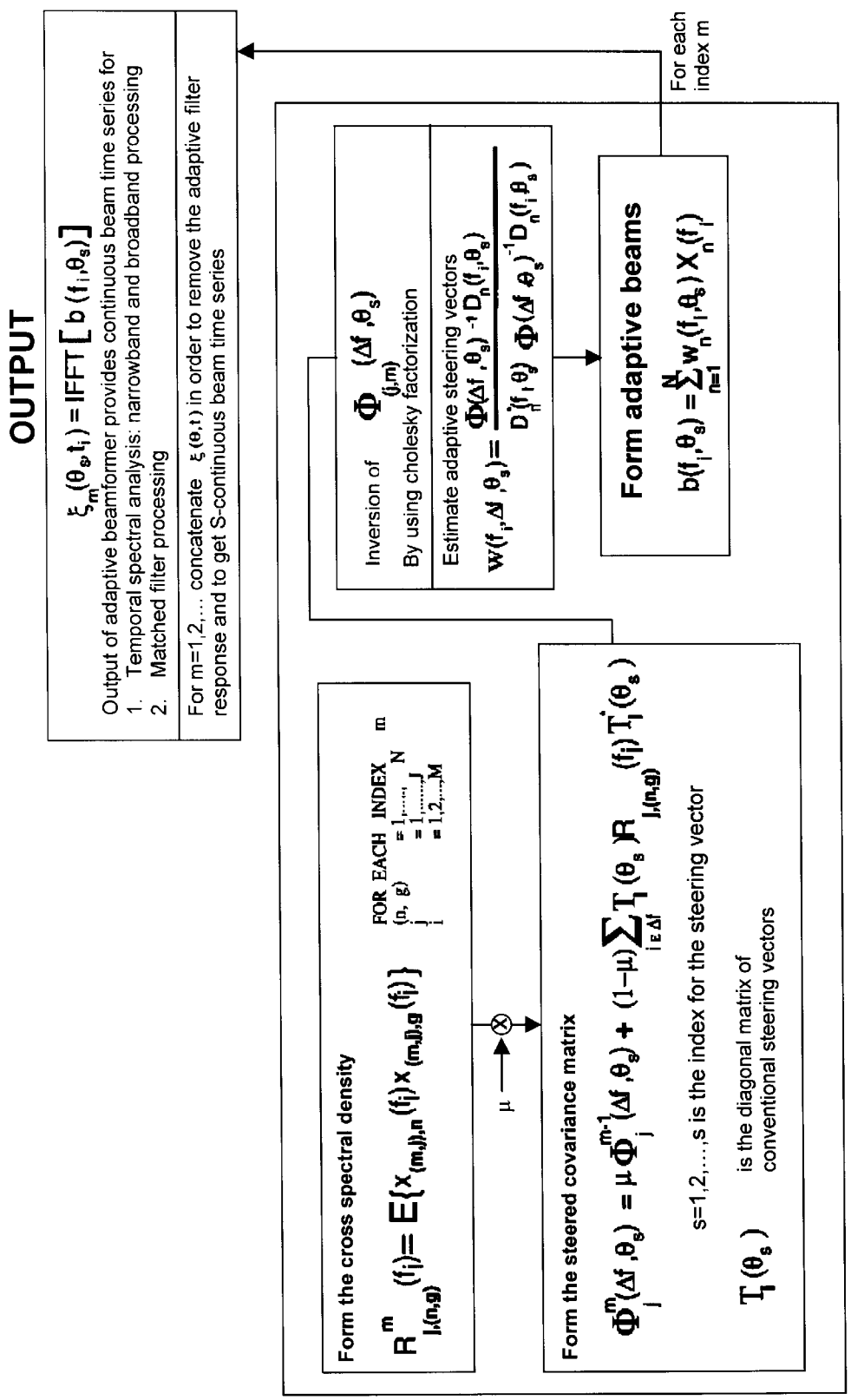
FIG. 5b is a simplified flow diagram of an adaptive beamformer according to the invention for an ultrasound imaging system for determining an estimation of the adaptive steering vectors.

FIGS. 5a and 5b show schematically the processing steps of the STMV beamformer as discussed above. First the sensor time series are segmented, overlapped and transformed into frequency domain using FFT, shown in FIG. 5a. In a following step, shown in FIG. 5b, the STCM is determined based on equations (10) and (13). The STCM is then inverted using Cholesky factorization and in order to determine an estimation of the adaptive steering vectors according to equation (15). The adaptive steering vectors are then integrated in the frequency domain forming adaptive beams. Finally, adaptive beams in time domain are then formed through IFFT $$b(t_i,\theta_s,\Phi_s)=IFFT\{B(f_i,\theta_s,\Phi_s)\}, \quad (19)$$

wherein overlap and concatenation of segments are discarded to form a continuous beam time series.

Matrix inversion is a major issue for implementing adaptive beamformers in real time applications. Standard numerical methods for solving systems of linear equations can be applied to solve for the adaptive weights. The numerical methods include:

Cholesky factorization of the covariance matrix $R(f_k)$. This allows the linear system to be solved by backsubstitution in terms of the received data vector.

QR decomposition of the received vector $\overline{X}(f_i)$ which includes conversion of a matrix to upper triangular form via rotations. The QR decomposition method has better stability than the Cholesky factorization but requires twice as much computational effort.

SVD (Singular Value Decomposition) method. The SVD method is the most stable factorization technique but requires three time more computational effort than the QR decomposition method.

For investigative studies of the beamforming process according to the present invention Cholesky factorization and QR decomposition techniques have been applied. No noticeable differences in performance concerning stability have been found between these methods. Of course, for real time applications the fastest algorithm is preferred.

Another major concern for implementing adaptive beamforming in real time applications is the requirement of knowledge of second order statistics for the noise field, derived from equations (10) and (13). These statistics are usually not known but can be estimated from the received data by averaging a large number of independent samples of the covariance matrix $R(f_k)$. With K being the effective number of statistically independent samples of $R(f_k)$ and N being the number of sensors 8 the variance of the second order statistics for the noise field—the adaptive beam output power estimator detection statistic—is inversely proportional to (K−N+1). Theoretical estimations as well as empirical observations suggest that K has to be four times greater than N in order to get coherent beam time series at the output of the adaptive beamformer. For arrays with a large number of sensors implementation of adaptive beamformers as statistically optimum beamformers requires averaging a very large number of independent samples of $R(f_k)$, which is not applicable in real time systems. A solution to this problem is updating of the covariance matrix using an exponential window in the form of a time varying adaptive estimation of $R(f_k)$ at time $t_k$. The time varying adaptive estimation is the exponentially time averaged estimator—geometric forgetting algorithm—at time $t_k$:

$$R^{t_k}(f_i)=\mu R^{t_{k-1}}(f_i)+(1-\mu)\overline{X}(f_i)\overline{X}^*(f_i), \quad (20)$$

wherein $\mu$ is a smoothing factor (0<$\mu$<1) implementing exponentially weighted time averaging.

Implementation of an adaptive beamformer with a large number of adaptive weights for a large number of sensors requires very long convergence periods eliminating dynamical characteristics of the adaptive beamformer to detect time varying characteristics of a received signal of interest. This limitation can only be avoided by reducing the number of adaptive weights. A reduction of the number of adaptive weights is achieved by introducing a sub-aperture processing scheme according to the present invention.

Figure 6:
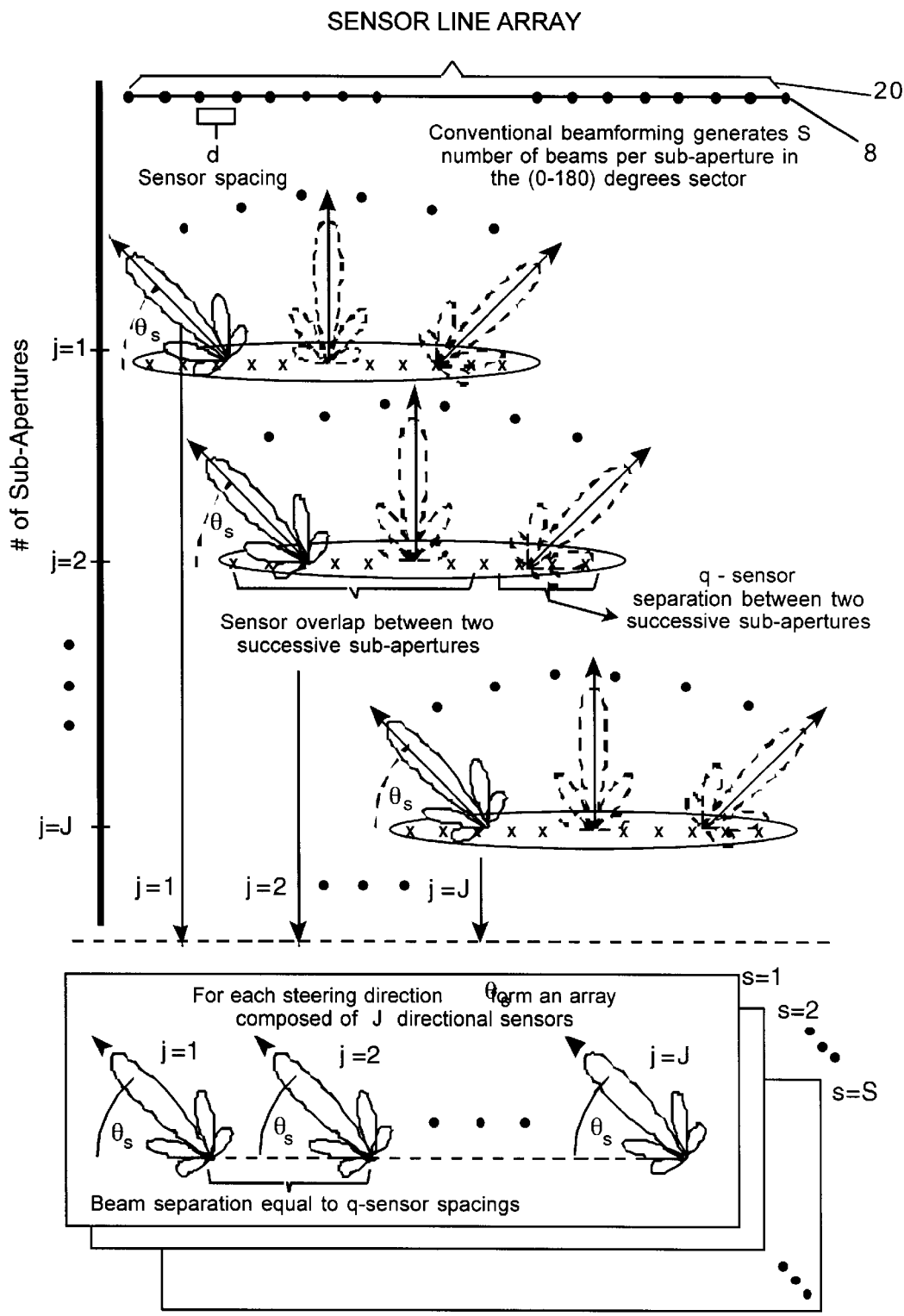
FIG. 6 is a simplified diagram of a line array of sensors for an ultrasound imaging system illustrating an adaptive sub-aperture structure according to the invention.

FIG. 6 illustrates a sub-aperture configuration for a line array 20 of sensors 8. The line array is divided into a plurality of overlapping sub-arrays. In a first stage the sub-arrays are beamformed using a conventional beamformer generating a number of sets of beams equal to the number of sub-arrays for each steering direction. In a second stage adaptive beamforming is performed on each set of beams steered in a same direction in space but each beam belonging to a different sub-array. A set of beams is equivalent to a line array consisting of directional sensors steered at a same direction with sensor spacing being equal to space separation between two contiguous sub-arrays and with the number of sensors being equal to the number of sub-arrays.

Figure 7:
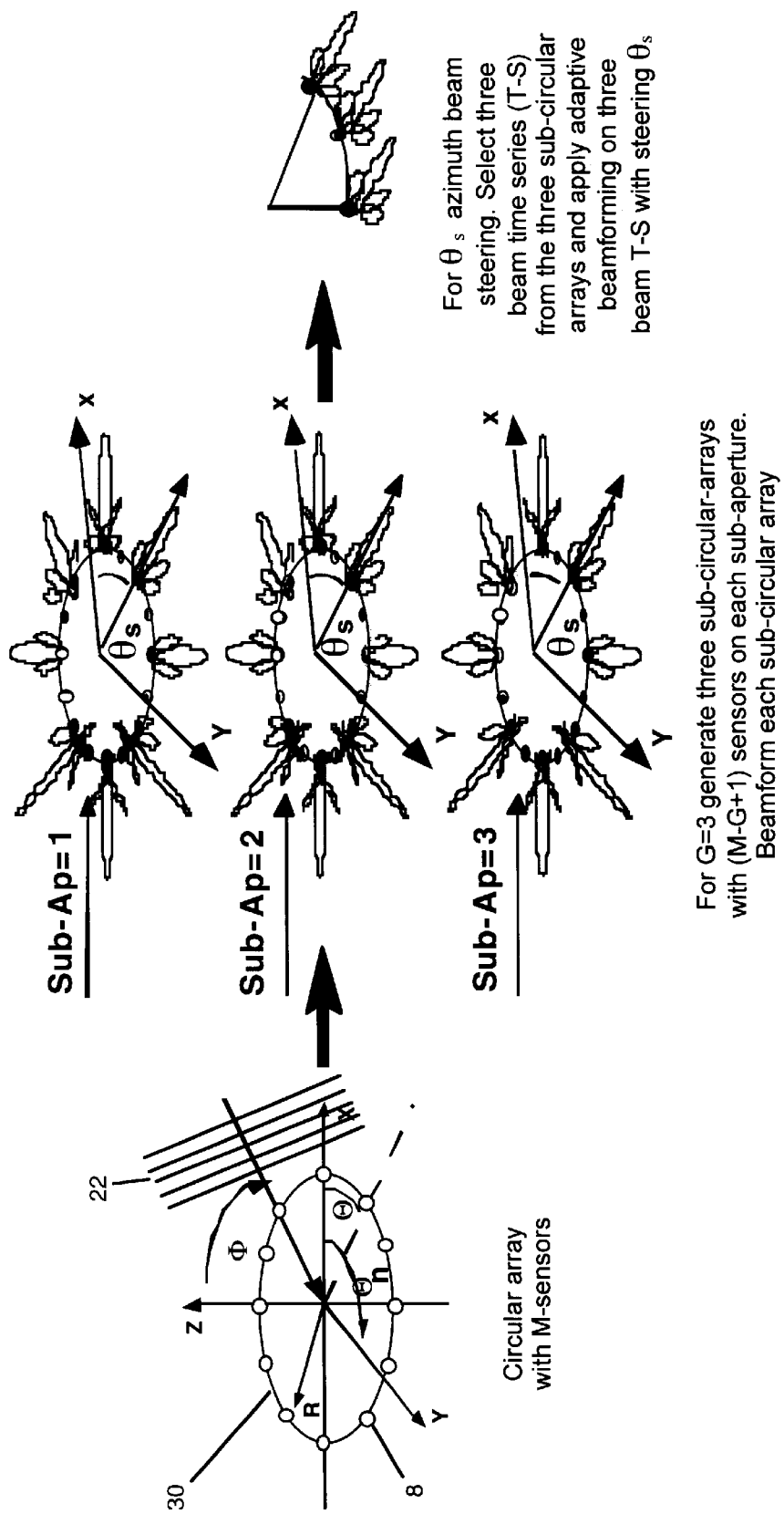
FIG. 7 is a simplified diagram of a circular array of sensors for an ultrasound imaging system illustrating an adaptive sub-aperture structure according to the invention.

FIG. 7 illustrates a sub-aperture configuration for a circular array 30 with M sensors 8 according to the invention. A first circular sub-aperture consists of first M−G+1 sensors with n=1, 2, . . . , M−G+1, wherein n is a sensor index and G is the number of sub-apertures. A second circular sub-aperture consists of M−G+1 sensors with n=2, 3, . . . , M−G+2. Sub-aperture formation is continued until a last sub-aperture then consists of M−G+1 sensors with n=G, G+1, . . . , M. In a first stage each circular sub-aperture is beamformed using a conventional beamformer generating G sets of beams for each steering direction. The second stage includes adaptive beamforming on a set of beams steered in a same direction in space but each belonging to a different circular sub-aperture. FIG. 7 illustrates these sub-aperture steps for G=3.

Figure 8:
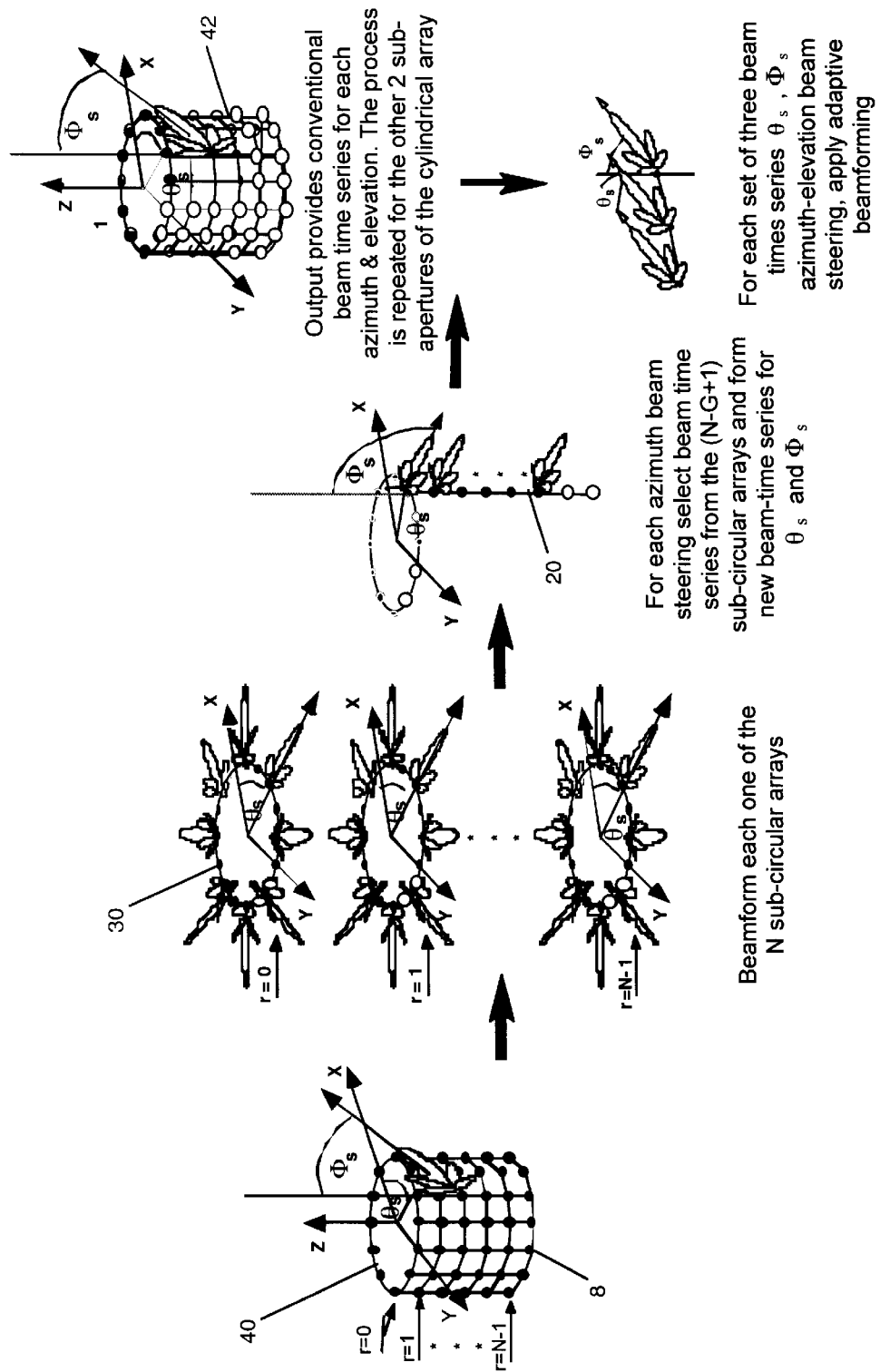
FIG. 8 is a simplified diagram of a cylindrical array of sensors for an ultrasound imaging system illustrating an adaptive sub-aperture structure according to the invention.

Referring to FIG. 8, a sub-aperture configuration for a cylindrical array 40 according to the invention is shown. The cylindrical array 40 comprises =NM sensors 8, wherein N is the number of circular rings and M is the number of sensors on each ring. Formation of sub-apertures is performed as follows:

A first sub-aperture consists of the first (N−G+1) rings with n=1, 2, . . . , N−G+1 being a ring index and G being the number of sub-apertures. In each ring a first set of M−G+1 sensors, with m=1, 2, . . . M−G+1 being a sensor index for each ring, is selected. The first sub-aperture forms a cylindrical array cell 42, indicated by small circles in the upper right picture of FIG. 8. Conventional beamforming is then applied to the cylindrical array cell 42 using the decomposition process according to the invention as described above. For a given steering direction comprising azimuth angle $\theta_s$ and elevation angle $\phi_s$ the multidimensional sub-aperture beamformer provides beam time series $b_{g=1}(t_i,\theta_s,\phi_s)$ with subscript g=1 indicating the first sub-aperture.

A second sub-aperture consists of a subsequent set of (N−G+1) rings with n=2, 3 , . . . , N−G+2. In each ring a consecutive set of M−G+1 sensors with m=2, 3, . . . M−G+2 is selected. These selected sensors then form a second sub-aperture cylindrical array cell. Again conventional beamforming is then applied and for a given steering direction the multidimensional sub-aperture beamformer provides beam time series $b_{g=2}(t_i,\theta_s,\phi_s)$ with subscript g=2 indicating the second sub-aperture.

Sub-aperture formation is continued until a last sub-aperture then consists of a subsequent set of (N−G+1) rings with n=G, G+1 . . . , N. In each ring a last set of M−G+1 sensors with m=G, G+1, . . . , M is selected. Conventional beamforming is then applied and for a given steering direction the multidimensional sub-aperture beamformer provides beam time series $b_{g=G}(t_i,\theta_s,\phi_s)$ with subscript g=G indicating the last sub-aperture.

A second stage of beamforming comprises an adaptive beamformer on a line array consisting of, for example, G=3 beam time series $b_g(t_i,\theta_s,\phi_s)$, g=1, 2, . . . , G, as shown in FIG. 8. For a given pair of azimuth and elevation steering angles $\{\theta_s,\phi_s\}$, the cylindrical adaptive beamforming process is reduced to an adaptive line array beamformer. The adaptive line array beamformer comprises only three beam time series $b_g(t_i,\theta_s,\phi_s)$, g=1, 2, 3 with spacing $\delta=[(R2\pi/M)^2+\delta_z^2]^{1/2}$ between two contiguous sub-aperture cylindrical cells, wherein (R2π/M) is the sensor spacing on each ring and wherein $\delta_z$ is the distance between each ring along the z-axis of the cylindrical array 40. The adaptive line array beamformer provides one or more adaptive beam time series with steering centered on the pair of azimuth and elevation steering angles $\{\theta_s,\phi_s\}$.

Because of the very small number of degrees of freedom in each sub-aperture the adaptation process experiences near-instantaneous convergence. Furthermore, the multidimensional sub-aperture beamforming process according to the invention may include a wide variety of adaptive noise cancellation techniques such as MVDR and GSC as discussed in:

S. Stergiopoulos: "Implementation of Adaptive and Synthetic Aperture Processing Schemes in Integrated Active-Passive Sonar Systems", Proceedings of the IEEE, 86(2), pp. 358–397, February, 1998.

B. Windrow et al.: "Adaptive Antenna Systems", Proceedings IEEE, 55(12), pp. 2143–2159, 1967;

N. L. Owsley: "Sonar Array Processing", S. Haykin, Editor, Prentice-Hall Signal Processing Series, A. V. Oppenheim Series Editor, pp. 123, 1985; and, B. Van Veen and K. Buckley: "Beamforming: a Versatile Approach to Spatial Filtering", IEEE ASSP Mag., pp. 4–24, 1988.

Figure 9:
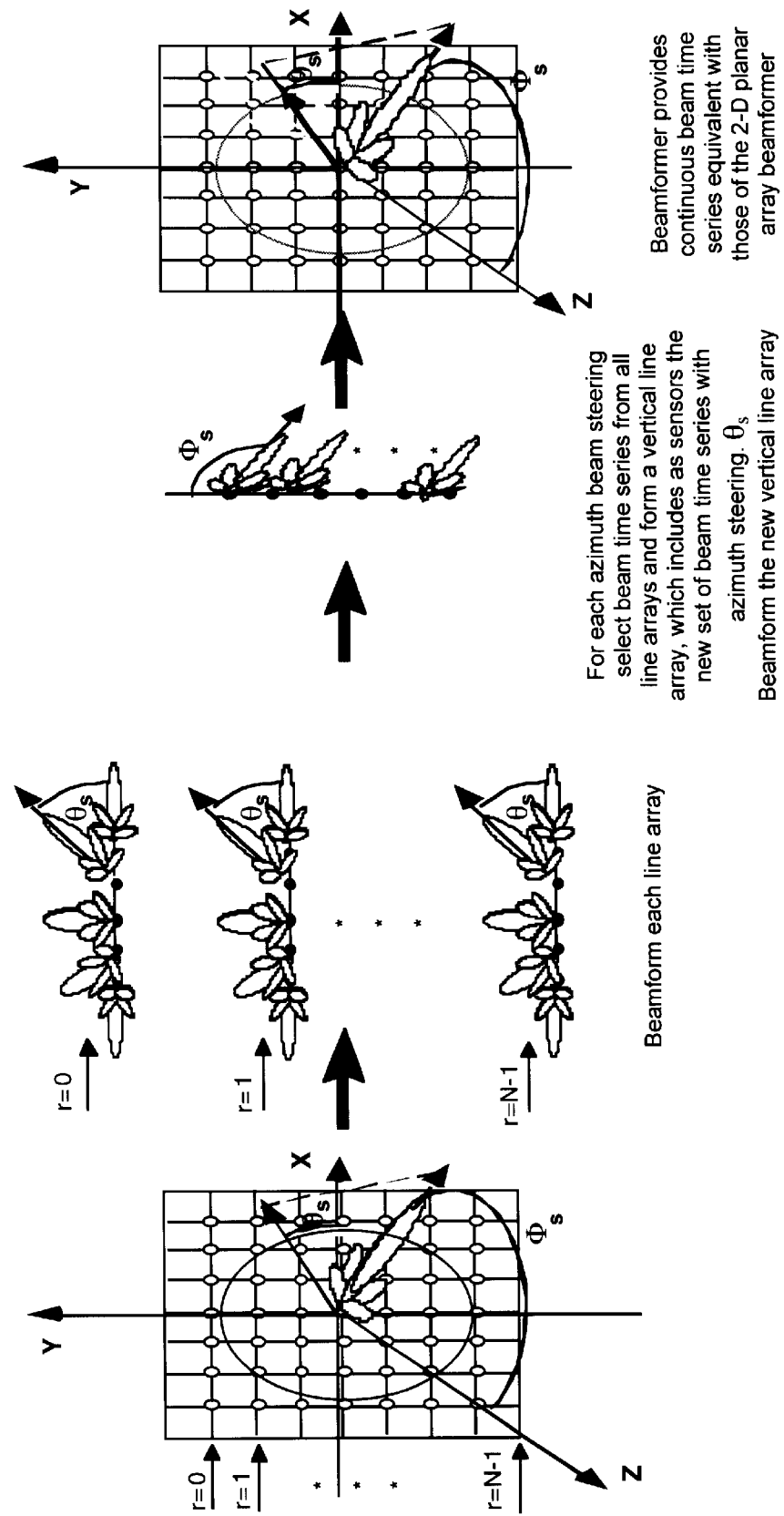
FIG. 9 is a simplified diagram of a planar array of sensors for an ultrasound imaging system illustrating an adaptive sub-aperture structure according to the invention.

Furthermore, the sub-aperture configuration according to the invention is applicable to other multidimensional arrays such as planar arrays and spherical arrays. Decomposition, sub-aperture formation as well as implementation of adaptive beamformers for planar and spherical arrays are similar to corresponding steps for cylindrical arrays discussed above. In particular, for planar arrays, formation of sub-apertures is based on the sub-aperture adaptive concept for line arrays as illustrated in FIG. 9. Similarly, formation of sub-apertures for spherical arrays is based on the sub-aperture adaptive concept of circular arrays.

Figure 10A:
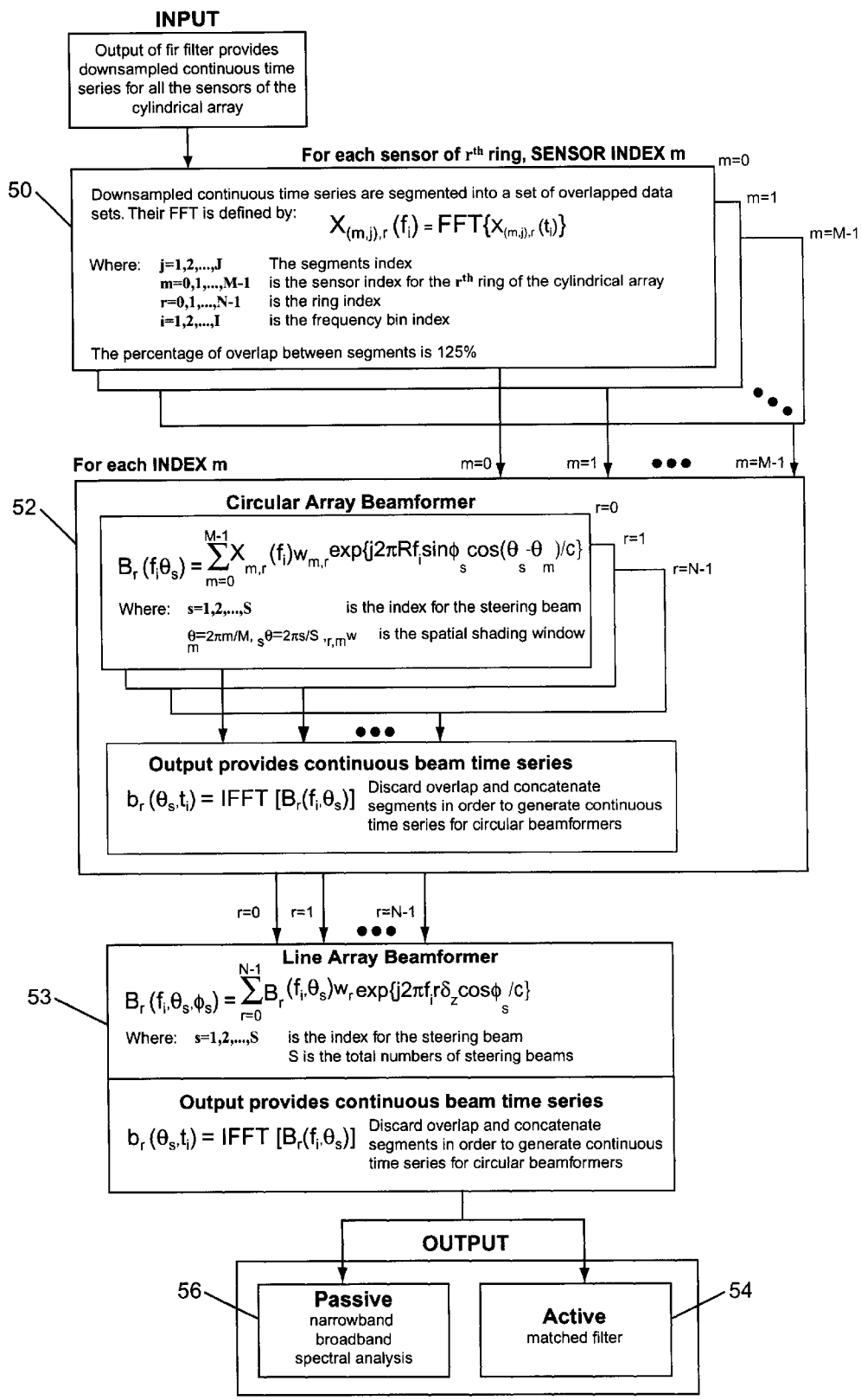
FIG. 10a is a schematic diagram of a signal processing flow according to the invention for beamforming cylindrical arrays.
Figure 10B:
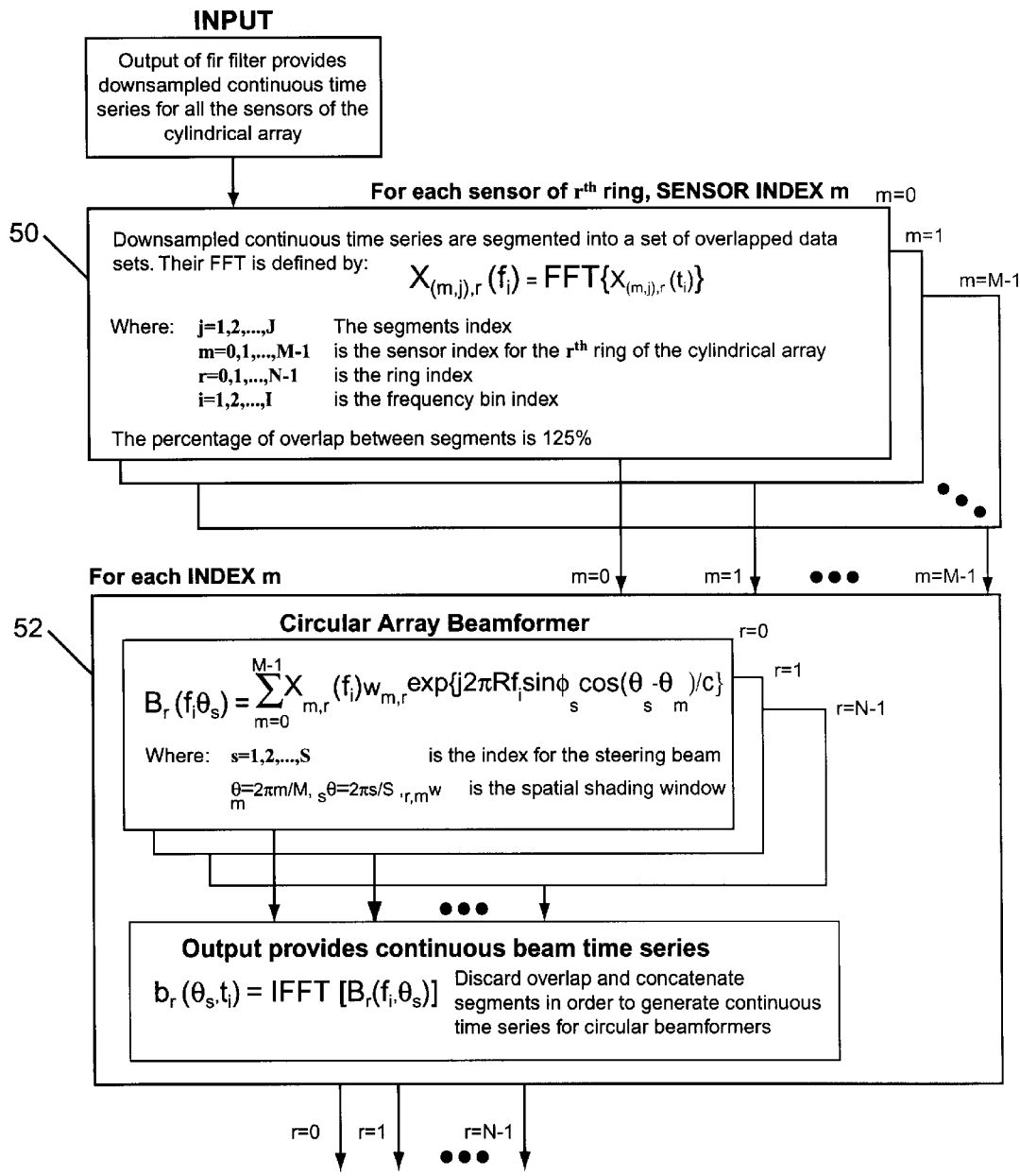
FIG. 10b is a schematic diagram of a signal processing flow according to the invention for beamforming cylindrical arrays illustrating a circular array beamformer.
Figure 10C:
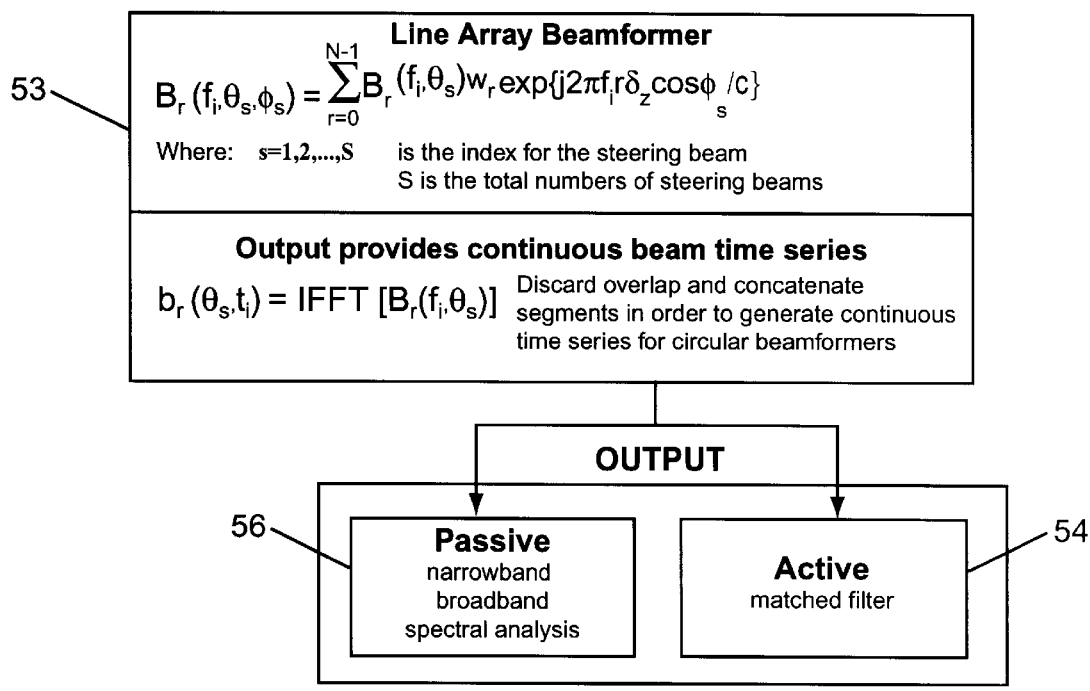
FIG. 10c is a schematic diagram of a signal processing flow according to the invention for beamforming cylindrical arrays illustrating a linear array beamformer.

FIGS. 10a, 10b, and 10c illustrate schematically the modular structure of the signal processing flow for a 3D cylindrical array of an ultrasound imaging system according to the invention. Line and circular array beamformers are implemented as Finite Impulse Response (FIR) filters. Reconfiguration of the different processing modules in FIG. 10a allows application of the signal processing flow to a variety of ultrasound imaging systems with, for example, line, planar or spherical sensor arrays.

A first processing module 50 includes partitioning of time series received from a sensor array, computation of an initial spectral FFT of the partitioned time series, selection of a frequency band of interest via band-pass FIR filters and downsampling. The output of module 50 comprises a continuous time series at a reduced sampling rate.

Second module 52 and third module 53 comprising circular array and line array beamformers provide continuous directional beam time series using a FIR scheme for spatial filtering via circular convolution. Segmentation and overlap of an input of the beamformers takes care of wraparound errors due to fast-convolution signal processing operations. The overlap is equal the effective FIR filter's length.

Module 54 is used for processing echoes obtained from active ultrasound applications.

Module 56 includes final processing steps of a temporal spectral analysis.

Finally, data normalization processing schemes are used to map output results into a dynamic range of display devices.

In the module 56 use of verniers and the temporal spectral analysis—incorporating segment overlap, windowing and FFT coherent processing—provide narrow band results for all the beam time series. Normalization and OR-ing are final processing steps before displaying the output results.

In the active module 54 application of a matched filter—or replica correlator—on the beam time series provides broadband processing. This allows detection of echoes as a function of range and bearing for reference waveforms transmitted by active transducers of ultrasound systems.

Figure 11A:
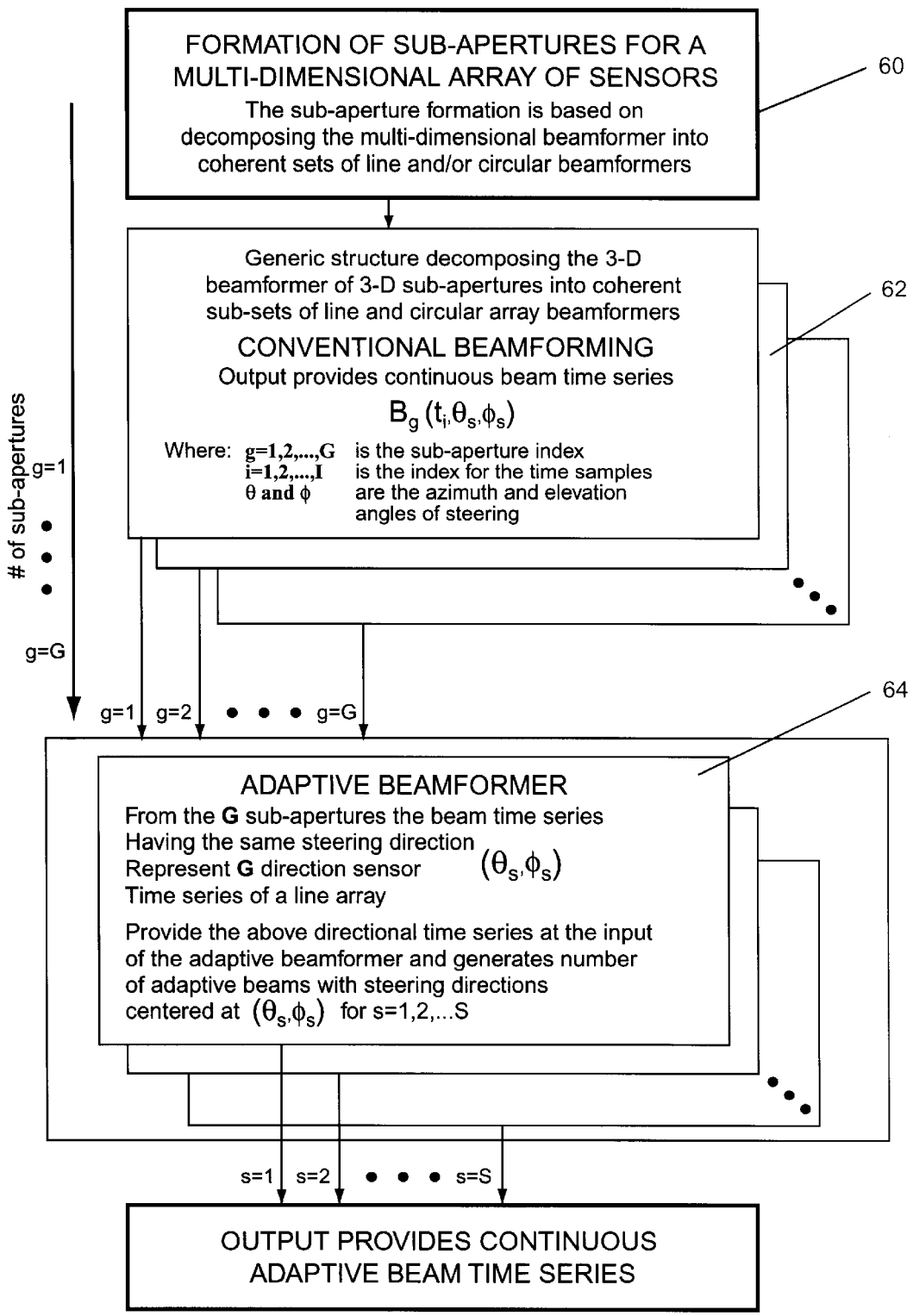
FIG. 11a is a schematic diagram of a signal processing for an adaptive sub-aperture structure for multidimensional arrays according to the invention.
Figure 11B:
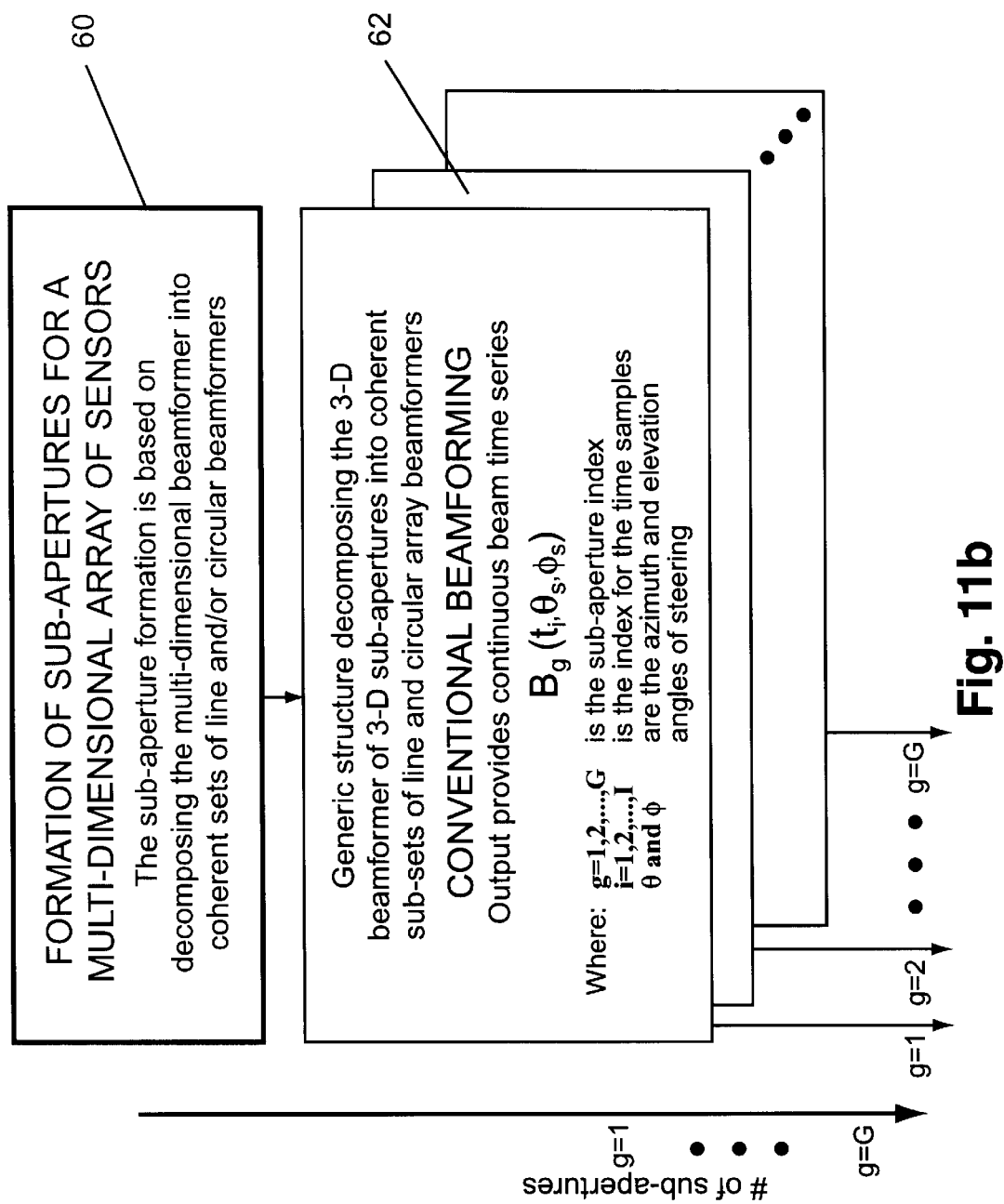
Figure 11C:
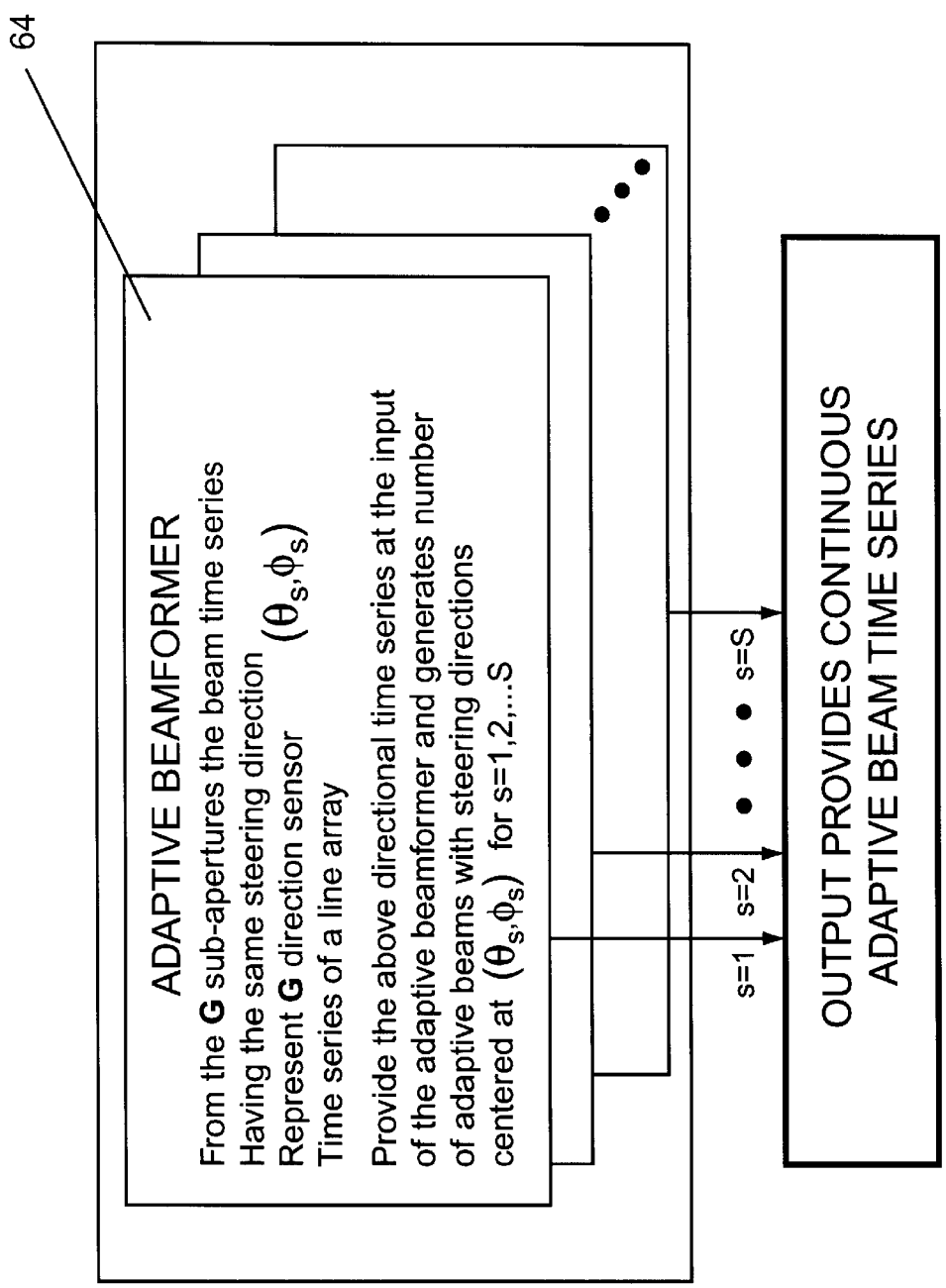

Referring to FIG. 11*a*, a schematic diagram of a signal processing flow for the sub-aperture configuration of multidimensional arrays according to the invention is shown. Module 60 includes formation of sub-apertures according to the invention. In a next step, sensor time series of each sub-aperture are beamformed in module 62, as illustrated in FIG. 11*b*, using a conventional beamformer for multidimensional arrays according to the invention as shown in FIG. 10 providing a beam time series for each sub-aperture. A second stage of beamforming is performed in module 64, shown in FIG. 11*c*. The second stage includes adaptive beamforming of the beam time series obtained in module 62. The adaptive beamformer provides one or more adaptive beam time series with steering centered on same azimuth and elevation angles as the conventional beams.

The signal processing flow for the sub-aperture configuration of multidimensional arrays as shown in FIG. 11 may be incorporated in modules 52 and 53 of the signal processing flow shown in FIG. 10.

In another embodiment of signal processing according to the invention the sub-aperture adaptive beamformer is combined with a synthetic aperture beamformer—ETAM algorithm—for further improvement of the image resolution. The synthetic aperture beamformer provides sensor time series corresponding to a synthesized sensor array comprising a larger number of sensors than the real—physical—sensor array used for providing input sensor time series to the synthetic aperture beamformer. Details concerning the synthetic aperture beamformer are disclosed in U.S. Pat. No. 4,930,111 issued to Sullivan E. D. and Stergiopoulos S. in 1990. In a first step the sensor time series are processed using the synthetic aperture beamformer and are provided as input to the sub-aperture adaptive beamformer. Alternatively, this method may be used to obtain a satisfying image resolution when smaller sensor arrays are deployed in compact ultrasound imaging systems.

The sub-aperture adaptive beamformer according to the invention has been tested with simulated as well as with real data sets in order to demonstrate that it achieves near instantaneous convergence and, therefore, provides output beamtime series having sufficient temporal coherence and correlate with the reference signal. Provision of output beamtime series having sufficient temporal coherence is essential for matched filter processing or temporal spectral analysis in passive and active ultrasound imaging systems.

Figure 12:
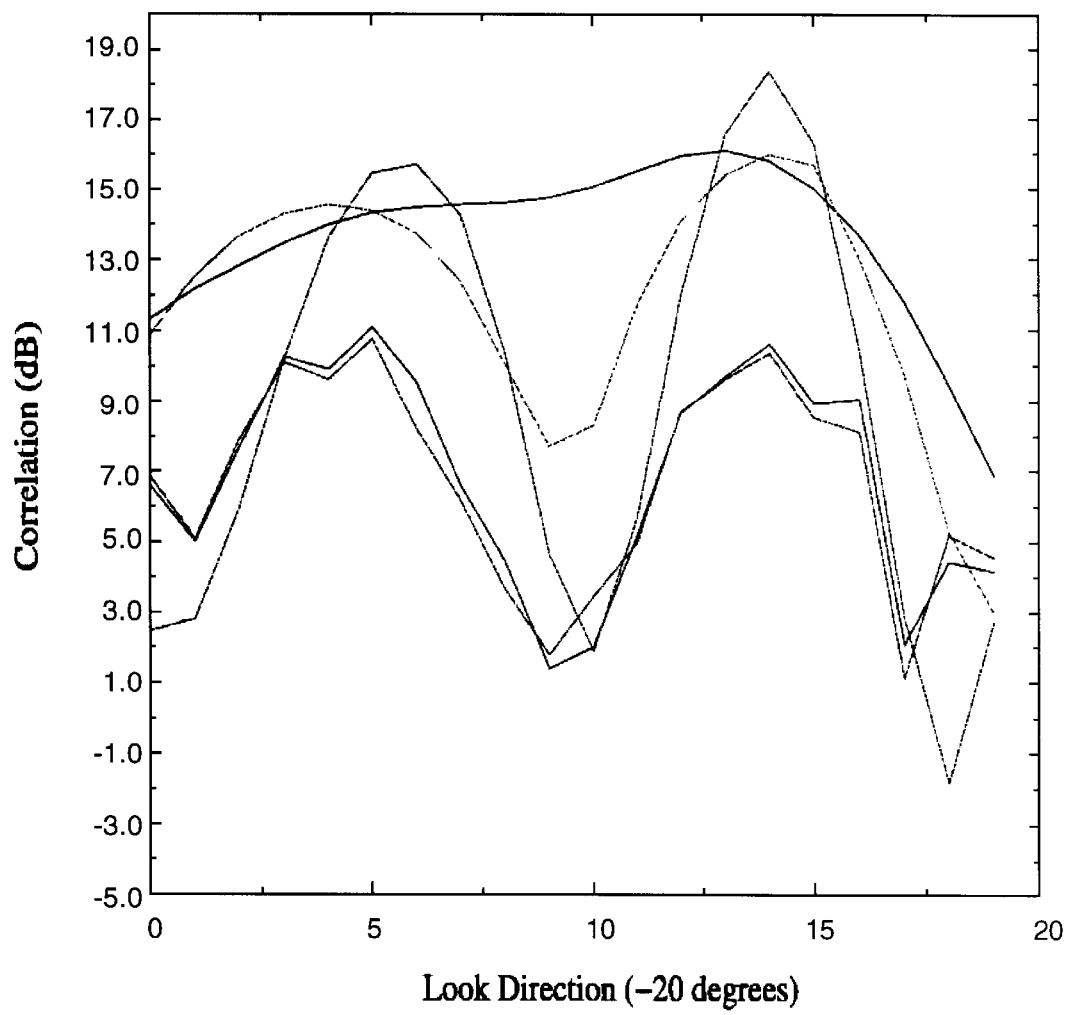
FIG. 12 is a schematic diagram illustrating power of beam response to active CW pulses as function of steering angle for various types of beamformers.

Referring to FIG. 12, the power of beam response to active CW pulses as function of steering angle for various types of beamformers—conventional beamformer on a 48 sensor planar array (1); sub-aperture adaptive beamformer according to the invention on a 48 sensor planar array (2); synthetic aperture (ETAM algorithm) beamformer extending a physical 48 sensor planar array into a synthetic 144 sensor planar array (3); combined synthetic aperture and sub-aperture adaptive beamformer according to the invention on a 48 sensor planar array (4); and, conventional beamformer on a 144 sensor planar array (5)—is shown. As is apparent from the results presented in FIG. 12, the sub-aperture adaptive beamformer according to the invention provides an angular resolution similar to a conventional beamformer applied on a three times larger planar array. Further improvements to angular resolution are obtained by combining the sub-aperture adaptive beamformer with the synthetic aperture beamformer according to the invention as shown in FIG. 12 at the expense of more computational effort being involved in the beamforming process.

Figure 13:
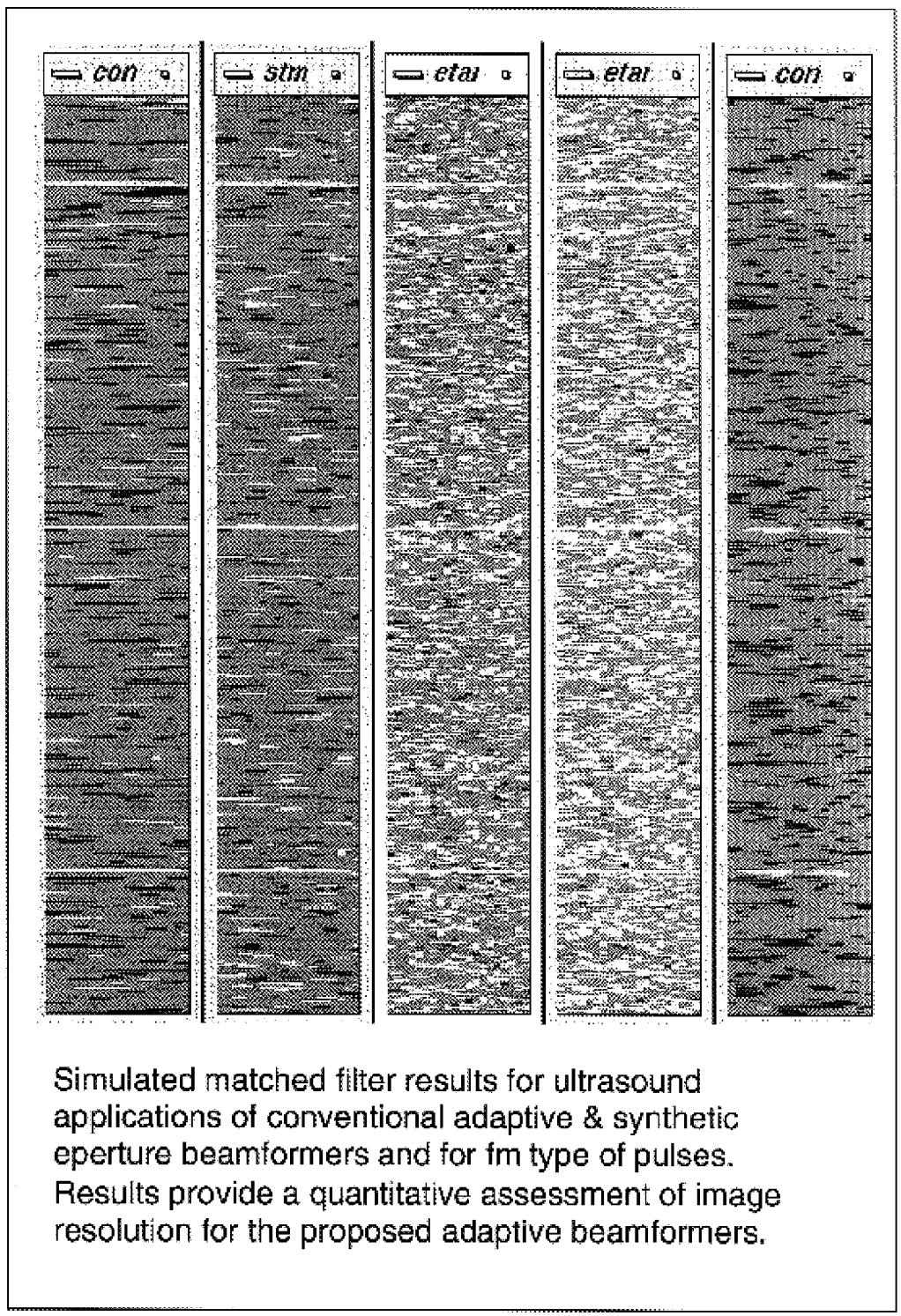
FIG. 13 illustrates simulated matched filter results of various types of beamformers for ultrasound applications.

Furthermore, the sub-aperture adaptive beamformer according to the invention has been tested with synthetic data sets including broadband FM pulses with a repetition rate of a few minutes to demonstrate the efficiency of the sub-aperture adaptive beamformer according to the invention to achieve near-instantaneous convergence in order to provide coherent beamtime series for the broadband FM pulses. This is necessary to test, because adaptive processing schemes require at least a few iterations to converge to an optimum solution. The output beamtime series have been processed using a matched filter and their arrangement as GRAMs provides a waterfall display of ranges (depth) as a function of beam-steering as shown in FIG. 13. For each beamformer the horizontal axis includes 20 steering beams in a 10-degrees angular sector centered in a −20 degree look-direction. The vertical axis represents time delay or depth penetration of the signal within a human body. Thus, the detected echoes along the vertical axis of each window shown in FIG. 13 represent reflections from simulated objects such as organs. From left in FIG. 13 the different beamformers used are: a conventional beamformer on a 48 sensor array; a sub-aperture adaptive beamformer according to the invention on a 48 sensor array; a synthetic aperture (ETAM algorithm) beamformer extending a physical 48 sensor array into a synthetic 144 sensor array; a combined synthetic aperture and sub-aperture adaptive beamformer according to the invention on a 48 sensor array; and, a conventional beamformer on a 144 sensor array. As is obvious, the conventional beamformer applied on the 48 sensor array—first window on the left in FIG. 13—has failed to resolve the two echoes. This represents the performance characteristic of current state-of-the-art ultrasound imaging systems. The following three windows in FIG. 13 show results of the adaptive beamformers according to the invention applied to a 48 sensor array. As is evident, in all three windows two echoes are clearly visible. The resolution of the adaptive beamformers according to the invention is comparable to the resolution of a conventional beamformer applied on a three times larger sensor array as shown in the window on the right in FIG. 13.

Figure 14:
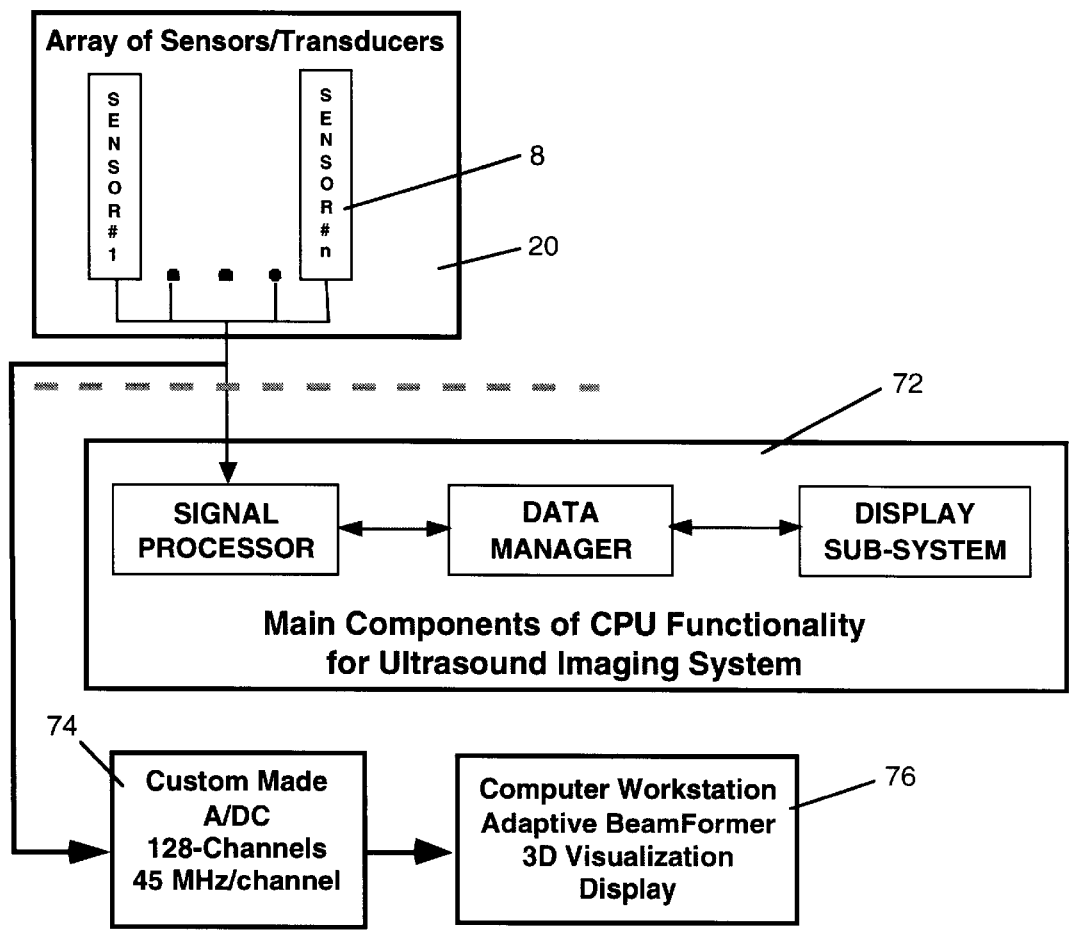
FIG. 14 is a simplified diagram of an ultrasound imaging system to assess image resolution improvements of an adaptive beamformer according to the invention; and, FIG. 15 shows various 3D images of a fetus' skull obtained by using state-of-the-art signal processing techniques and by applying the adaptive beamformer according to the present invention to the signals captured by a state-of-the-art ultrasound system.

In order to demonstrate the improvement, the adaptive beamformer according to the present invention has been implemented within a general purpose ultrasound imaging system for medical diagnostic applications as shown in FIG. 14. The system comprises: a line array 20 of 32 sensors 8; a state-of-the-art signal processing unit 72; a custom-made A/DC 74 with 12 bit and 45 MHz sampling frequency per channel; and, a computer workstation 76 for adaptively beamform the sensor time series provided by the line array 20 and for image reconstruction and for 3D visualization.

Figure 15:
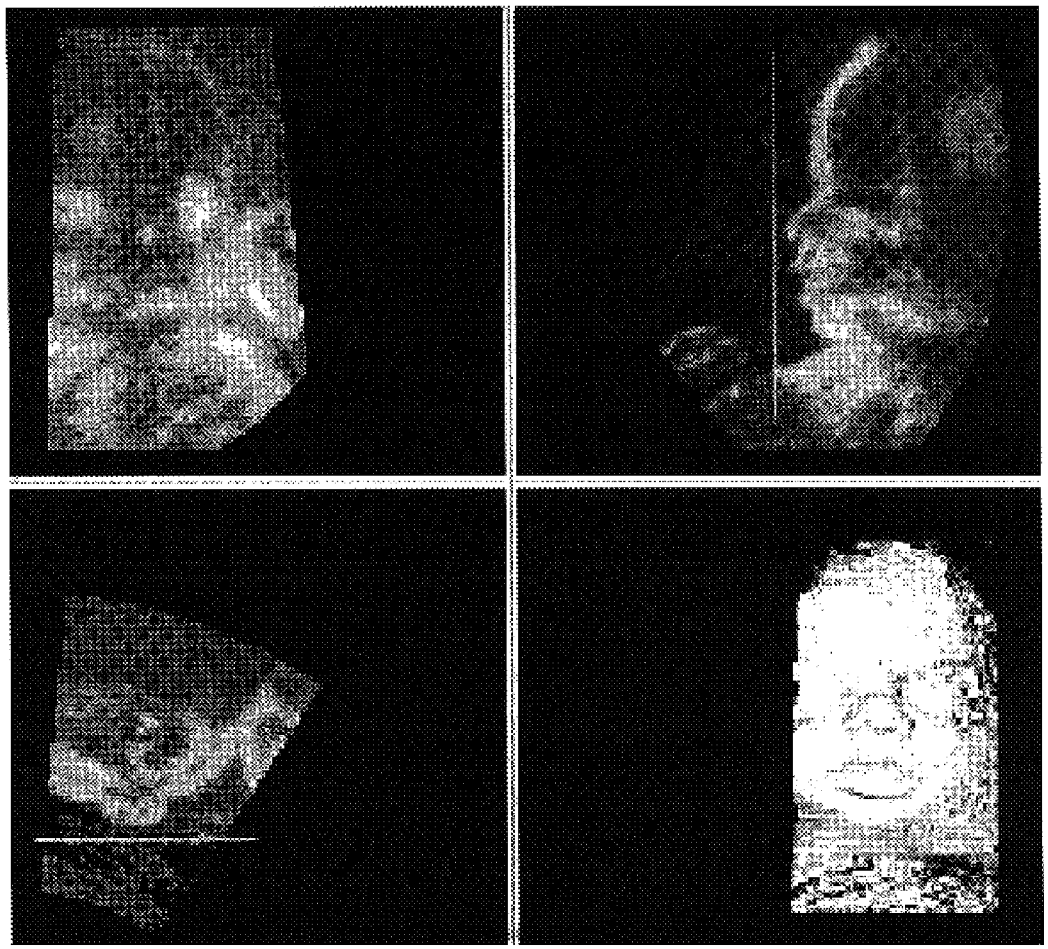

FIG. 15 shows typical 3D images of a fetus' skull. The two top images and the bottom left image have been obtained using state-of-the-art ultrasound systems and signal processing whereas the bottom right image has been obtained by applying the adaptive beamformer according to the present invention to the signals captured by a state-of-the-art ultrasound system. As is evident, application of the adaptive beamformer according to the present invention substantially enhances the image resolution.

Further enhancement of the image resolution is obtained by applying the adaptive beamformer according to the present invention to multidimensional—2D or 3D—sensor arrays allowing better angular resolution of the signals during the beamforming process.

As shown by the results presented in FIGS. 12, 13 and 15 the adaptive beamformer according to the present invention achieves near-instantaneous convergence and enhances image resolution substantially. Therefore, the adaptive beamformer is highly advantageous for applications in ultrasound imaging and may be implemented into existing ultrasound systems for improving image resolution. In a preferred embodiment the adaptive beamformer according to the invention is used to provide a compact field-deployable ultrasound system for providing high resolution images in real time. This is achieved by applying the adaptive beamformer on signals obtained from compact multidimensional arrays and using a sub-aperture structure reducing the degrees of freedom within each sub-aperture thus minimizing the computational effort for beamforming multidimensional arrays. Therefore, the beamforming process requires only a conventional workstation and is performed in real time.

Of course, numerous other embodiments may be envisaged without departing from the spirit and scope of the invention.

What is claimed is:

1. A field deployable 3D ultrasound imaging system for producing high resolution 3D images of an object, the ultrasound system comprising:
   a compact adaptive multidimensional sensor array for capturing reflections of ultrasound waves, the ultrasound waves being reflected by different structures within the object, and for providing sensor time series indicative of the reflected ultrasound waves;
   a processing unit for:
      receiving the sensor time series produced by the multidimensional sensor array;
      processing the sensor time series in order to produce continuous beamtime series by:
         decomposing the multidimensional sensor array into two coherent subsets of at least one of circular array beamformers and line array beamformers, a first subset comprising subsequent beamformers in a first coordinate direction of the multidimensional array and a second subset comprising subsequent beamformers in a second other coordinate direction of the multidimensional array;
      beamforming for a predetermined beam steering direction of data relating to the sensor time series by applying the subsequent beamformers of the first subset, each beamformer producing a beam time series;
      beam forming for the predetermined beam steering direction of each beam time series of the first subset of beamformers applying the subsequent beamformers of the second subset for the steered direction producing one beam time series for the beam steering direction; and,
   reconstructing 3D images from the beam time series.

2. A field deployable 3D ultrasound imaging system for producing high resolution 3D images of an object in real time as defined in claim 1 comprising a source for emitting ultrasound waves.

3. A field deployable 3D ultrasound imaging system for producing high resolution 3D images of an object in real time as defined in claim 2 comprising a display for displaying the reconstructed 3D images.

4. A field deployable 3D ultrasound imaging system for producing high resolution 3D images of an object in real time as defined in claim 3 wherein the compact adaptive multidimensional sensor array comprises a planar array.

5. A field deployable 3D ultrasound imaging system for producing high resolution 3D images of an object in real time as defined in claim 3 wherein the compact adaptive multidimensional sensor array comprises a cylindrical array.

6. A field deployable 3D ultrasound imaging system for producing high resolution 3D images of an object in real time as defined in claim 3 wherein the compact adaptive multidimensional sensor array comprises a spherical array.

7. A field deployable 3D ultrasound imaging system for producing high resolution 3D images of an object in real time as defined in claim 3 wherein the processing unit is a compact processing unit.

8. A field deployable 3D ultrasound imaging system for producing high resolution 3D images of an object in real time as defined in claim 7 wherein the compact processing unit is capable of processing the sensor time series and reconstructing 3D images in real time.

9. A field deployable 3D ultrasound imaging system for producing high resolution 3D images of an object in real time as defined in claim 8 wherein the compact processing unit comprises a computer workstation.

10. A field deployable 3D ultrasound imaging system for producing high resolution 3D images of an object in real time as defined in the computer workstation comprises a plurality of processors liar parallel processing beamformers of a subset.

11. A field deployable 3D ultrasound imaging system for producing high resolution 3D images of an object iii real time, the ultrasound system comprising:
   a source for emitting ultrasound waves;
   a compact adaptive multidimensional sensor array for capturing reflections of the ultrasound waves, the ultrasound waves being reflected by different structures within the object, and for providing sensor time series indicative of the reflected ultrasound waves;
   a compact processing unit for:
      receiving the sensor time series produced by the multidimensional sensor array;
      processing the sensor time series in read time in order to produce continuous beamtime series by:
         a) dividing the multidimensional sensor array into a plurality of subsequent sub-apertures;
         b) decomposing each sub-aperture into two coherent subsets of at least one of circular array beamformers and line array beamformers, a first subset comprising subsequent beamformers in a first coordinate direction of the multidimensional array and a second subset comprising subsequent beamformers in a second other coordinate direction of the sub-aperture;
         c) conventional beamforming each sub-aperture for a predetermined beam steering direction a Fourier transform of the sensor time series by applying the subsequent beamformers of the first subset each beamformer producing a beam time series;

d) conventional beamforming each sub-aperture liar the predetermined beam steering direction of the beaux time series produced by the beamformers of step c) by applying the subsequent beamformers of the second subset for the steered direction producing one beam time series for the beam steering direction for each sub-aperture;

e) adaptive beamforming on line arrays, each line array comprising beam time series of different subsequent sub-apertures in one coordinate direction, providing one or more beam time series for the beam steering direction; and, reconstructing 3D images from the beam time series in real time; and, a display for displaying the reconstructed 3D images in real time.

12. A field deployable 3D ultrasound imaging system for producing high resolution 3D images of an object in real time as defined in claim 11 wherein the compact adaptive multidimensional sensor array comprises a planar array.

13. A field deployable 3D ultrasound imaging system for producing high resolution 3D images of an object in real time as defined in claim 11 wherein the compact adaptive multidimensional sensor array comprises a cylindrical array.

14. A field deployable 3D ultrasound imaging system for producing high resolution 3D images of an object in real time as defined in claim 11 wherein the compact adaptive multiidimensional sensor array comprises a spherical array.

15. A field deployable 3D ultrasound imaging system for producing high resolution 3D images of an object in real time as defined in claim 11 wherein the processing unit is for segmenting the continuous sensor time series into a set of overlapped data sets.

16. A field deployable 3D ultrasound imaging system for producing high resolution 3D images of an object in real time as defined in claim 15 wherein the processing unit is for calculating a FFT of each overlapped data set.

17. A field deployable 3D ultrasound imaging system for producing high resolution 3D images of an object in real dine as defined in claim 16 wherein the processing unit is for forming adaptive beams in frequency domain from the Fourier transform of the overlapped data sets.

18. A field deployable 3D ultrasound imaging system for producing high resolution 3D images of an object in real lime as defined in claim 17 wherein the processing unit is for forming adaptive beams in time domain through IFFT.

19. A field deployable 3D ultrasound imaging system for producing high resolution 3D images of an object in real time, the ultrasound system comprising:

a source for emitting ultrasound waves;

a compact adaptive multidimensional sensor array for capturing reflections of the ultrasound waves, the ultrasound waves being reflected by different structures within the object, and for providing sensor time series indicative of the reflected ultrasound waves;

a compact processing unit for:
receiving the sensor time series produced by the multidimensional sensor array;
processing the sensor time series in real time in order to produce continuous beamtime series by:
segmenting the continuous sensor time series into a set of overlapped data sets; calculating a FFT of each overlapped data set producing a set of Fourier transforms of the overlapped data sets for different frequency bins;
forming a cross spectral density matrix from the Fourier transforms of the overlapped data sets for each frequency bin and each predetermined steering direction;
forming a steering covariance matrix using the cross spectral density matrix and a diagonal matrix of conventional steering vectors, one steering covariance matrix for each steering direction and a frequency band of interest;
inverting the steering covariance matrices;
estimating adaptive steering vectors by assuming stationarity across frequency bins of a frequency band of interest and considering an estimate of the steering covariance matrix being the same as a narrow band estimate for a center frequency of the frequency band of interest;
determining narrow band adaptive steering weights using the estimate of the adaptive steering vectors;
forming adaptive beams in frequency domain from the Fourier transform of the overlapped data sets and the adaptive steering weights;
forming adaptive beams in time domain through IFFT;
determining continuous beam time series by discarding overlap and concatenation of segments; and,
reconstructing 3D images from the beam time series in real time; and,
a display for displaying the reconstructed 3D images in real time.

20. A field deployable 3D ultrasound imaging system for producing high resolution 3D images of an object in real rime as defined in claim 19 wherein the compact adaptive multidimensional sensor array comprises a planar array.

21. A field deployable 3D ultrasound imaging system for producing high resolution 3D images of an object in real time as defined in claim 19 wherein the compact adaptive multidimensional sensor an-dy comprises a cylindrical array.

22. A field deployable 3D ultrasound imaging system for producing high resolution 3D images of an object in real time as defined in claim 19 wherein the compact adaptive multidimensional sensor array comprises a spherical array.

* * * * *